US010393887B2

(12) United States Patent
Margaryan et al.

(10) Patent No.: US 10,393,887 B2
(45) Date of Patent: Aug. 27, 2019

(54) FLUORINE RESISTANT, RADIATION RESISTANT, AND RADIATION DETECTION GLASS SYSTEMS

(71) Applicant: AFO RESEARCH, INC., Glendale, CA (US)

(72) Inventors: Ashot A. Margaryan, Glendale, CA (US); Alfred A. Margaryan, Glendale, CA (US)

( * ) Notice: Subject to any disclaimer, the term of this patent is extended or adjusted under 35 U.S.C. 154(b) by 11 days.

(21) Appl. No.: 15/212,263

(22) Filed: Jul. 17, 2016

(65) Prior Publication Data

US 2017/0016995 A1 Jan. 19, 2017

Related U.S. Application Data

(60) Provisional application No. 62/194,239, filed on Jul. 19, 2015.

(51) Int. Cl.

| | |
|---|---|
| ***C03C 4/12*** | (2006.01) |
| ***G01T 1/20*** | (2006.01) |
| ***G21K 4/00*** | (2006.01) |
| ***C03C 3/247*** | (2006.01) |
| ***C09K 11/73*** | (2006.01) |

(52) U.S. Cl.

CPC ................ *G01T 1/20* (2013.01); *C03C 3/247* (2013.01); *C03C 4/12* (2013.01); *C09K 11/73* (2013.01); *G21K 4/00* (2013.01)

(58) Field of Classification Search

None

See application file for complete search history.

(56) References Cited

U.S. PATENT DOCUMENTS

| | | | | |
|---|---|---|---|---|
| 2,430,539 A | | 11/1947 | Sun | |
| 2,481,700 A | | 9/1949 | Sun et al. | |
| 2,511,225 A | | 6/1950 | Sun | |
| 2,511,227 A | | 6/1950 | Sun | |
| 3,775,075 A | * | 11/1973 | Keck | C03B 37/018 65/421 |
| 3,842,271 A | * | 10/1974 | Gee | G01T 1/202 250/310 |

(Continued)

FOREIGN PATENT DOCUMENTS

| | | |
|---|---|---|
| CN | 101269913 A | 9/2008 |
| JP | 50-014273 | 2/1975 |

(Continued)

OTHER PUBLICATIONS

PCT/US16/42709 ; Filing Date: Jul. 18, 2016; ISR and Written Opinion dated Nov. 15, 2016.

(Continued)

*Primary Examiner* — Edwin C Gunberg

(74) *Attorney, Agent, or Firm* — Patent Law Agency, LLC; Peter Ganjian

(57) ABSTRACT

The present invention discloses one or more compounds that oscillate between a first state and a second state due to absorption of high energy, with the oscillations facilitating prevention of solarization of a glass system for reuse while generating scintillations for determining existence of high radiation energy. The generation of scintillations have a duration that is commensurate with a duration of the irradiation of the glass system, and cease when irradiation is ceased without affecting the glass system.

15 Claims, 9 Drawing Sheets

(56) References Cited

U.S. PATENT DOCUMENTS

| | | | | |
|---|---|---|---|---|
| 3,846,142 | A | 11/1974 | Buzhinsky et al. | |
| 3,941,672 | A | 3/1976 | Tanaka et al. | |
| 4,040,846 | A | 8/1977 | Broemer et al. | |
| 4,120,814 | A | 10/1978 | Izumitani et al. | |
| 4,142,088 | A | 2/1979 | Hirsch | |
| 4,182,664 | A | 1/1980 | Marklad et al. | |
| 4,225,459 | A | 9/1980 | Faulstich et al. | |
| 4,286,163 | A | 8/1981 | Suzuki | |
| 4,386,163 | A | 5/1983 | Kodama | |
| 4,620,863 | A | 11/1986 | Tomozawa et al. | |
| 4,642,297 | A | 2/1987 | Mennemann et al. | |
| 4,771,020 | A | 9/1988 | Omata et al. | |
| 4,885,019 | A | 12/1989 | Hutta | |
| 4,946,490 | A | 8/1990 | Hall et al. | |
| 4,962,067 | A | 10/1990 | Myers | |
| 4,990,468 | A | 2/1991 | Komiya et al. | |
| 5,017,520 | A | 5/1991 | Otsuka et al. | |
| 5,032,315 | A | 7/1991 | Hyden et al. | |
| 5,045,507 | A | 9/1991 | Tran | |
| 5,068,209 | A | 11/1991 | Meinert et al. | |
| 5,273,834 | A * | 12/1993 | Hoover | G11B 5/7315 428/426 |
| 5,526,369 | A | 6/1996 | Hayden et al. | |
| 5,635,109 | A | 6/1997 | Otsuka | |
| 5,755,998 | A | 5/1998 | Yamazaki et al. | |
| 5,809,199 | A | 9/1998 | Tran | |
| 5,846,638 | A | 12/1998 | Meissner | |
| 6,163,026 | A * | 12/2000 | Bawolek | G02B 5/208 250/208.1 |
| 6,310,352 | B1 | 10/2001 | Gross et al. | |
| 6,429,162 | B1 | 8/2002 | Prassas | |
| 6,430,349 | B1 | 8/2002 | Hyden et al. | |
| 6,495,481 | B1 | 12/2002 | Margaryan | |
| 6,891,470 | B2 | 5/2005 | Bohinc, Jr. | |
| 7,088,903 | B2 | 8/2006 | Ishioka | |
| 7,211,783 | B2 | 5/2007 | Beinhocker | |
| 7,371,703 | B2 | 5/2008 | Masumura et al. | |
| 7,394,060 | B2 | 6/2008 | Beinhocker | |
| 7,608,551 | B2 | 10/2009 | Margaryan et al. | |
| 7,637,124 | B2 | 12/2009 | Margaryan et al. | |
| 7,786,446 | B2 | 8/2010 | Iwazaki | |
| 7,989,376 | B2 | 8/2011 | Margaryan | |
| 8,356,493 | B2 | 1/2013 | Margaryan | |
| 8,361,914 | B2 | 1/2013 | Margaryan et al. | |
| 8,592,331 | B2 | 11/2013 | Yuan et al. | |
| 2003/0040421 | A1 | 2/2003 | Margaryan | |
| 2003/0226971 | A1 | 12/2003 | Chandross et al. | |
| 2005/0058424 | A1 | 3/2005 | Ishioka | |
| 2005/0188724 | A1 | 9/2005 | Ikenishi et al. | |
| 2005/0259944 | A1 | 11/2005 | Anderson et al. | |
| 2006/0033983 | A1 | 2/2006 | Dai et al. | |
| 2006/0245460 | A1 | 11/2006 | Lou et al. | |
| 2007/0010390 | A1 | 1/2007 | Margaryan | |
| 2009/0247387 | A1 | 10/2009 | Ikenishi | |
| 2009/0255297 | A1 | 10/2009 | Margaryan et al. | |
| 2010/0108914 | A1* | 5/2010 | Fechner | C03C 3/091 250/492.1 |
| 2010/0111487 | A1 | 5/2010 | Aitken et al. | |
| 2010/0327171 | A1* | 12/2010 | Robinson | G01T 3/08 250/370.05 |
| 2010/0327186 | A1* | 12/2010 | Margaryan | C03B 5/08 250/474.1 |
| 2012/0074356 | A1 | 3/2012 | Fukuda et al. | |
| 2012/0132830 | A1* | 5/2012 | Monro | G01T 1/10 250/484.4 |
| 2012/0282630 | A1 | 11/2012 | Geddes | |
| 2013/0299720 | A1 | 11/2013 | Osinski et al. | |
| 2014/0092376 | A1* | 4/2014 | Xu | G01N 21/19 356/51 |
| 2014/0166889 | A1 | 6/2014 | Kang et al. | |
| 2014/0239196 | A1 | 8/2014 | Shoji et al. | |

FOREIGN PATENT DOCUMENTS

| | | |
|---|---|---|
| JP | 57-123842 | 8/1982 |
| JP | Tokkaisyo57-12384 | 8/1982 |
| JP | Tokkaisyo59-18113 | 1/1984 |
| JP | Tokkaihei11-60267 | 2/1999 |
| JP | 11-060267 | 3/1999 |
| JP | A_2005075687 | 3/2005 |
| JP | 2005-112717 | 4/2005 |
| JP | A_2005112717 | 4/2005 |
| JP | Tokkai2005-112717 | 4/2005 |
| JP | 2014-167404 | 9/2014 |
| RU | 567692 | 5/1977 |
| RU | 2036173 | 5/1995 |
| WO | WO 9913541 | 3/1999 |
| WO | WO2006/006640 A1 | 1/2006 |
| WO | WO2007/005953 | 1/2007 |

OTHER PUBLICATIONS

Office action from the Canadian Intellectual Property Office dated Mar. 26, 2014; Canadian Patent Application No. 2,742,078.

Office action from the EPO dated Mar. 25, 2014; EPO Application No. RPS/117063EP00 ; 09824144.1-1354/2361231.

Office action from the Israeli Patent Office dated Apr. 13, 2014; Israeli Application No. P-74915-IL.

Office action from the Japan Patent Office dated Apr. 13, 2014; Japan Application No. 2011-534788.

Office Action form Canadian Patent Office dated Oct. 4, 2012; Title of Canadian Patent Application: Optical Components for Use in High Energy Environment With Improved Optical Characteristics; First Named Inventor: Alfred A. Margaryan.

Office action from the Canadian Intellectual Property Office dated Jun. 21, 2013; Canadian Patent Application No. 2,742,078.

Office action from the Japanese Patent Office dated Jul. 24, 2013 ; Japanese Patent Application No. TOKUGAN2011-534788.

Ju H. Choi et al., “Dependence of thermo-mechanical and mechanical properties of novel fluorophosphate glass on variuos ratre earth dopants”, Journal of Material Science, U.S.A., Springer, Feb. 2008, vol. 43 No. 3, p. 1109-1113, ISSN : 0022-2461.

Stokowski et al., “Optical and Lasing Properities of Fluorophosphate Glass”, Jorunal of Non-Crystaline Solids 40 (1980) 481-487, North Holland Publishing Comppany.

EPO Office action for case 06786351.4; dated Mar. 16, 2011.

JPO—Office action for JP2008-519723; dated Dec. 21, 2011.

File History for U.S. Appl. No. 13/083,624, filed Apr. 11, 2011; Inventor Alfred A. Margaryan.

“The Bismuth Atom Neighborhood in Bismuth Silicate Glasses From X-Ray Absorption Experiment,” by Agniezka Witkowska et al., 6th International Conference on Intermolecular Interaction in Matter, Gdansk—Poland, Sep. 10-13, 2001. http://www.mif.pg.gda.pl/iim2001/abstracts/witkowska.html.

“Ultrafast Optical Switch and Wavelength Division Multiplexing (WDM) Amplifiers Based on Bismuth Oxide Glasses”, by Naoki Sugimoto, Research Center, Asahi Glass Co., Ltd., Yokohama 221-8755, vol. 85 No. 5, May 2002 Japan http://cat.inist.fr/?aModele=afficheN&cpsidt=13677293.

“Spectroscopic properties of Mn2+ in new bismuth and lead contained fluorophosphates glasses,” by A. Margaryan et al., published in Applied Physics, B78, 409-413 (2004).

“Erbium-doped potassium bismuth gallate glass,” Wong et al., vol. 19, Issue 8, 1839-1843, Aug. 2002, by S. Q. Man et al., Optics INFOBASE, published by OSA. http://www.opticsinfobase.org/josab/abstract.cfm?uri=josab-19-8-1839.

“Emission properties of PbO—Bi2O3—Ga2O3—Ge2O2 glasses doped with Tm3+ and Ho3+,” Jay Hyok Song et al., Photonic Glass Laboratory, Department of Material Science and Engineering, Pohang University of Science and Technology, San 31, Hyoja-dong, Nam-gu, Pohang, Gyeongbuk 790-784, Republic of Korea. Journal of Applied Physics—Jun. 15, 2003, vol. 93, Issue 12, pp. 9441-9445; http://scitation.aip.org/getabs/servlet/GetabsServlet?prog=normal&id=JAPIAU000093000012009441000001&idtype=cvips&gifs=yes.

(56) References Cited

OTHER PUBLICATIONS

Optical Engineering, vol. 6, Optical Materials, An Introduction to Selection and Application, Soloman Musikant, pp. 40 to 45.
"Physical Properties of Novel Lead Bismuthate Glasses with Large Transmitting Windows", Sun Hong Tao et la., Shanghai Institute of Optics and Fine Mechanics, Chinese Academy of Sciences, Shanghai 201800, 2004 Chinese Physics. Lett. 21 1759-1761; http://www.iop.org/EJ/abstract/0256-307X/21/9/023.
Fluorophosphate vitreous systems; "Ligands and Modifiers in Vitreous Materials, Spectroscopy of Condensed Systems," Alfred A. Margaryan, World Scientific Pub. Inc., 1999. http://www.aforesearch.com/scientificpublication.html.
"Spectroscopy of Activated Fluoroberyllate Glasses," Alfred A. Margaryan and Manvel G. Manvelyan, Hayastan Press, Yerevan, 1974, pp. 15-113. http://www.aforesearch.com/scientificpublication.html.
Nuclear and Space Radiation Effects on Materials (NASA Space Vehicle Design Criteria), NASA SP-8053, 1970.
"New Technique to Apply Optical Fiber Image Guide to Nuclear Facilities," Atsushi Kimura, Eiji Takada, Yoneichi Hosono, Masaharu Nakazawa, Hiroyuki Takahashi and Hiroyuki Haymi, Journal of Nuclear Science and Technology, vol. 39, No. 6, pp. 603-607, 2002.
"Radiation Effects Dataon Commercially Available Optical Fiber: Database Summary," Melanie N. Ott, Sigma Research and Engineering, Code 562, NASA Goddard Space Flight Center, Greenbelt, Maryland, USA.
"Application of General Purpose Fiber Optic Data Links to Radiation Measurements," Eiji Takada and Toshimitsu Komatsu, Journal of Nuclear Science and Technology, vol. 40, No. 6, pp. 363 to 369, 2003.
"Gamm-Radiation Resistant Fabry-Perot Fiber Optic Sensors," Hanying Liu, Don W. Miller and Joseph Talnagi, Review of Scientific Instruments, vol. 73, No. 8, 2002.
"Radiation Damage," Stefania Baccaro, (Italian National Agency for New Technology, Engergy and the Environment, Advanced Physics Technologies), Submitted to World Scientific, Feb. 13, 2002.
"Dopant and concentration dependence of linear and nonlinear refractive index and dispersion for new (Mg, Ba) F2 based Fluorophosphate Glasses," Ju H. Choi, Frank G. Shi, Alfred A. Margaryan, Ashot A. Margaryan, T. G. Nieh, Proc. SPIE, 4970, 82-88, (2003).
"EXAFS spectroscopic study of PbO—Bi2O3—Ga2O3 glasses," Yong Gyu Choi et al., Journal of Non-Crystalline Solids, 259, 205-211 (1999)—Abstract.
"Spectroscopic properties and thermal stability of erbium-doped bismuth-based glass for optical amplifier," Jianhu Yan et al., Shanghai Institute of Optics & fine Mechanics, Chinese Academy of Science, Shanghai 201800, China, Journal of Applied Physics, Jan. 15, 2003, vol. 93, Issue 2, Abstract.
Physics and Chemistry of Rare-Earth Ions Doped Glasses; Editors: Nandyala Sooraj Hussain & José Domingos Da Silva Santos; vols. 46-47;2008; Chapter 2; http://www.aforesearch.com/scientificpublication.html.
Dependence of thermo-mechanical and mechanical properties of novel fluorophosphate glass on various rare earth dopants, Journal of Materials Science vol. 43, No. 3, 2008, pp. 1109-1113; http://www.aforesearch.com/scientificpublication.html http://www.aforesearch.com/scientificpublication.html.
Novel alkaline-free Er3+-doped fluorophosphate glasses for broadband optical fiber lasers and amplifiers; Journal of Alloys and Compounds, vol. 450, Issues 1-2, 2008, pp. 540-545 http://www.aforesearch.com/scientificpublication.html.
Fluorescence and Nonradiative Properties of Nd3+ in Novel Heavy Metal Contained Fluorophosphate Glass; Advances in OptoElectronics vol. 2007 (2007), Article ID 39892, 8 pages doi:10.1155/2007/39892 http://www.aforesearch.com/scientificpublication.html.
Rare Earth Doped Photonic Glass Materials for the Miniaturization and Integration of Optoelectronic Devices; From 39th International Symposium on Microelectronics, Oct. 8-12, 2006 San Diego, California, http://www.aforesearch.com/scientificpublication.html.
Optical absorption and emission properties of Nd3+ doped fluorophosphates glass for broadband fiber amplifier applications; From Photonics West, Jan. 25-31, 2003, San Jose California, USA. http://www.aforesearch.com/scientificpublication.html.
Spectral properties of Nd 3+ ion in new fluorophosphates glasses: Judd-Ofelt intensity parameters; From Photonics West, Jan. 25-31, 2003, San Jose California, USA. http://www.aforesearch.com/scientificpublication.html.
Novel Broadband and Eye-safe Laser Source Materials: Alkaline-free Yb3+ doped Fluorophosphate Glasses for Fiber and Waveguade Lasers P4. Yb3+ doped Fluorophosphate glasses for fiber and waveguide lasers; From "The International Symposium on Photonic Glasses" Abstract Oct. 14-17, 2002 Shanghai, P.R. China http://www.aforesearch.com/scientificpublication.html.
Refractive index and low dispersion properties of new fluorophosphate glasses highly doped with rare-earth ions; Journal of Materials Research, Jan. 2005—vol. 20, No. 1, pp. 264-270 http://www.aforesearch.com/scientificpublication.html.
Optical transition properties of Yb3+ in new fluorophosphate glasses with high gain coefficient; Journal of Alloys and Compounds 2005—vol. 396, Issue 1-2, pp. 79-85 http://www.aforesearch.com/scientificpublication.html.
Judd-Ofelt analysis of spectroscopic properties of Nd3+-doped novel fluorophosphate glass; Journal of Luminescence, Sep. 2005—vol. 114, Issues 3-4, pp. 167-177 http://www.aforesearch.com/scientificpublication.html.
Spectroscopic properties of Yb3+ in heavy metal contained fluorophosphate glasses; Materials Research Bulletin Dec. 2005—vol. 40, Issue 12, pp. 2189-2197 http://www.aforesearch.com/scientificpublication.html.
Laser damage resistance of photo-thermal-refractive glass bragg gratings; Glebov et al.; University of Central Florida; 2004.
Lasers, Optics, and photonics resources and news; Yb(III) in new fluorophosphate glasses with high gains coefficient; Oct. 29, 2005.
www.AFOResearch.com; Laser Focus World, vol. 44,Issue 6 Jun. 2008; New optical fiber remains transparent under extreme gamma radiation.
www.AFOResearch.com; Laser Focus World, vol. 44, Issue 2 Feb. 2008; Specialty glass.
www.AFOResearch.com; Optical Glass; www.Photonics.com; Mar. 1, 2007.
www.AFOResearch.com; Laser Focus World—Jan. 2007; Fluorophosphate glass.
www.AFOResearch.com; Laser Focus World—Dec. 2006; Fluorophosphate glasses have high spectroscopic quality factors.
www.AFOResearch.com; Lasers, optics and photonics resources and news; Novel Fluorophosphate Glasses with Extremely High Spectroscopic Quality Factors. Nov. 27, 2006.
www.aforesearch.com; Lasers, optics and photonics resources and news; High level Gamma and Neutron radiation resistant non-silica glass; Date announced: Aug. 27, 2005.
www.aforesearch.com Lasers, optics and photonics resources and news; Yb(III) in New Fluorophosphate Glasses with High Gain Coefficient; Date announced: Oct. 29, 2005.
www.aforesearch.com Lasers, optics and photonics resources and news; Heavy Metal Contained Fluorophosphate Glasses with Extremely High Gain Coefficient; Date announced: Nov. 8, 2005.
www.aforesearch.com; From: Allpoints AFO Research's Next Generation Specialty Optical Glasses Provide Market Changing Opportunities for Medical, Commercial Laser, and Communications Industries http://www.aforesearch.com/news/afonews1.html Jan. 25, 2007.
www.aforesearch.com; dallasnews.com; PR Newswire AFO Research's Next Generation Specialty Optical Glasses Provide Market Changing Opportunities for Medical, Commercial Laser, and Communications Industries; Jan. 25, 2007.
www.aforesearch.com; L.A. Times; AFO Research's Next Generation Specialty Optical Glasses Provide Market Changing Opportunities for Medical, Commercial Laser, and Communications Industries; Jan. 25, 2007.

(56) References Cited

OTHER PUBLICATIONS www.aforesearch.com; Welcome to MDMA's Industry News Daily News Headlines from:AFO Research's Next Generation Specialty Optical Glasses Provide Market Changing Opportunities for Medical, Commercial Laser, and Communications Industries; Jan. 25, 2007.
www.aforesearch.com; PR NewsWire; AFO Research's Next Generation Specialty Optical Glasses Provide Market Changing Opportunities for Medical, Commercial Laser, and Communications Industries; Jan. 25, 2007.
PCT/US2006/026169; WO 2007/005953 A3; International search report and PCT application publication: Bismuth containing fluorophosphate glass and method for making thereof. www.wipo.int.
PCT/2009/62652; WO 2010/051393; International Search Report and PCT application publication; optical components for use in high energy environments with improved optical characteristics.
Fluorophosphate vitreous systems; From Alfred Margaryan; Legands and Modifiers in Vitreous Materials; Spectroscopy of Condensed Systems; Publisher: World Scientific; Singapore, New Jersey, London Hong Kong; 1999.
USPTO Office action for U.S. Appl. No. 12/607,962, dated Jan. 20, 2012; filed Oct. 28, 2009; Margaryan et al; This Office Action Cited the Chinese Patent Document CN 101269913A.
Propositions belonging to the thesis Luminescence and scintillation of Ce3+ doped inorganic materials for gamma ray detection ; Hans Van'T Spijker ; Mar. 15, 1999.
Non-Linear Response in the Scintillation Yeild of Lu2SiO5: Ce#+; P. Dorenbos; IEEE Transactions on Nuclear Science, vol. 41, No. 4, Aug. 1994.
Scinnitiallations Properties of LaCl3: Ce3+ Cystals: Fast, Efficient, and High-Energy Resolution Scintillators; E.V.D. Van Loef; IEEE Transations on Nuclear Science, vol. 48, No. 3, Jun. 2001.
Scintillation Properties of LaBr3:Ce3+ crystals; fast, efficient and high-energy resolution scintillators; Nuclear instruments and methods in physics research section a accelerators spectrometers detectors and associated equipment—A 486 (2002) 254-258 Jun. 2002.
USPTO Office action U.S. Appl. No. 12/607,962, filed Oct. 28, 2009; Inventor: Margaryan et al.
WO 2007/005953 A2; Margaryan et al. Jan. 11, 2007; PCT/U52006/026169; U.S. Appl. No. 11/174,486, filed Jul. 5, 2005; Same as U.S. Pat. No. 7,608,551.
57-123842; Japan; Pub Date: Aug. 2, 1982; Inventor: Kodama Hiroyuke; Abstract in English.
2007-112717; Japan; Pub Date: Apr. 28, 2005, Inventor: Ishioka Junko; Abstract in English.
Letter From Japan Firm in English That May Include Information That May Be of Help to Examiner; Includes List of References Cited. Date: Dec. 5, 2012.
Japan Office Action for Case 2011-534788; dated Dec. 3, 2012.
PCT/US2016/042709 ; Filing Date: Jul. 18, 2016 ; Prelminary Report on Patentability; dated Feb. 1, 2018.
Office Action From Japanese Patent Application 2018-502247 of U.S. Appl. No. 15/212,263; dated Feb. 20, 2019.
EPO Search Report dated Mar. 18, 2019 for Case PCT/US2016/042709.
XP-002789499; WPI/ 2017 Clarivate Analytics; Aug. 5, 1975; Thomson Scientific, London, GB; Please See EPO Search Report.
XP-002789500; WPI / 2017 Clarivate Analytics; May 27, 1995; Thomson Scientific, London, GB; Please See EPO Search Report.
Cerium-Containing Glasses for Fast Scintillators; Journal of Alloys and Compounds; 1998; 275-277; 1988; 733-737; by Laboratorie Des Matertaux Photonteques.

* cited by examiner

FLUORINE RESISTANT, RADIATION RESISTANT, AND RADIATION DETECTION GLASS SYSTEMS

CROSS-REFERENCE TO RELATED APPLICATIONS

This Application claims the benefit of priority of U.S. Provisional Utility Patent Application 62/194,239, filed 19 Jul. 2015, the entire disclosure of which is expressly incorporated by reference in its entirety herein.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relate to fluorine resistant, radiation resistant, and radiation detection alkali free fluorophosphate glass systems.

Description of Related Art

Conventional fluorophosphate-based glass systems are well known and have been in use for a number of years. Regrettably, existing conventional alkali free fluorophosphate-based glass systems that are radiation resistance do not provide a visible means for visually determining existence of radiation. That is, existing conventional alkali free fluorophosphate-based glass systems that are radiation resistance do not solarize, remain transparent within the visible portion of the electromagnetic spectrum, and scintillate outside the visible portion of the electromagnetic spectrum and hence, require external devices to be used in conjunction with the conventional glass systems to determine existence of radiation. For example, existing conventional alkali free fluorophosphate-based glass systems use Yb as a dopant and or co-dopant, which do not solarize, remain transparent within the visible spectrum, but generate scintillations within the infrared spectrum, which is obviously not detectable without the use of specialized devices. Non-limiting, non-exhaustive listing of examples of conventional alkali free fluorophosphate-based glass systems that are radiation resistance are disclosed in U.S. Pat. No. 7,608,551 to Margaryan et al., U.S. Pat. No. 7,637,124 to Margaryan et al., U.S. Pat. No. 7,989,376 to Margaryan, U.S. Pat. No. 8,356,493 to Margaryan, U.S. Pat. No. 8,361,914 to Margaryan et al., and U.S. Patent Application Publication 2010/00327186 to Margaryan et al., the entire disclosures of each and every one of which is expressly incorporated by reference in their entirety herein.

Further, existing conventional alkali free fluorophosphate-based glass systems are generally comprised of a base composition containing a maximum of only four raw compounds. However, the use of only four compounds limits the glass-forming domain, limiting the number of permutations for the glass formations (or types) that can be produced.

Additionally, existing conventional alkali free fluorophosphate-based glass systems with only four raw compounds have a generally low Z number (atomic number) by element. For example, the combined Z number of the conventional alkali free fluorophosphate-based glass system by element is approximately 50 to 56 for base glass composition:

$$Ba(PO_3)_2—Al(PO_3)_3—BaF_2—RF_x\text{-Dopants}$$

wherein:

R is selected from the group comprising of Mg, Ca, Bi, Y, La;

x is an index representing an amount of fluorine (F) in compound $RF_X$, and

Dopants may comprise of Yb, La.

It is well known that the lower the Z number for glass composition by element, the longer the excitation decay time is of an excitable element within the glass composition when irradiated. For example, in the case of the above composition, the excitation decay time of Yb dopant in response to emitted high-energy radiation is generally high, which would make the glass a somewhat poor choice for use in Positron Emission Tomography (PET) scans.

Furthermore, existing conventional alkali free fluorophosphate-based glass systems have low densities of about 4.1 grams per cubic centimeter (g/cm$^3$) or less, which is mostly due to the overall lower Z number by element. In general, low-density conventional alkali free fluorophosphate-based glass systems have a lower radiation resistance and shielding when exposed to high-energy environments. Another drawback with existing conventional alkali free fluorophosphate-based glass systems with low density is their lack of ability to shield against high energy electromagnetic pulses (EMP). Further, optically, due to lower density, conventional glass systems have lower refractive index $n_D$ of about 1.57 (for wavelengths of about 589 nm—the visible light portion of the electromagnetic spectrum).

An additional drawback with existing conventional silica-based glass systems is that they have a poor or low resistance to fluorine, which means for example, they cannot be used as optical components in water treatment plants that utilize high levels of concentrations of fluorine without clouding up and pitting to the point that they are no longer transparent.

Accordingly, in light of the current state of the art and the drawbacks to current glass systems mentioned above, a need exists for glass systems that would have improved radiation resistance and shielding against high energy radiation and that would provide scintillations within the visible spectrum to provide a visible means for visually determining existence of high energy radiation. That is, a need exists for glass systems that would provide scintillations within the visible spectrum to provide visual indication of existence the of high energy radiation commensurate with duration thereof. In other words, a need exist for a glass system that would scintillate within the visible spectrum when irradiated (i.e., exposed to high energy environment). Further, a need exists for glass systems that would provide a greater (larger) glass-forming domain for larger number of permutations for the glass formations (or types) that may be produced. Additionally, a need exists for glass systems that would have a larger overall Z number by element, resulting in higher density, higher refractive index $n_D$, and shorter excitation decay time. Additionally, a need exists for glass systems that would provide EMP shielding capabilities. Finally, a need exists for glass systems that would be fluorine resistance.

BRIEF SUMMARY OF THE INVENTION

One or more embodiments of the present invention provide glass systems that do not solarize (e.g., maintain transparency and remain clear) in high energy environments before, during, and post irradiation in high-intensity gamma-ray radiation dosage of $1.29\times10^9$ rads and greater, and high neutron energy at neutron fluxes ranging from $3\times10^9$ to $1\times10^{14}$ n/cm$^2$ sec and greater, and fluencies ranging from $2\times10^{16}$ to $8.3\times10^{20}$ n/cm$^2$ and greater, and mixtures thereof. The present invention provides glass systems with radiation resistance that can withstand high-energy irradiations with respect to mixture of high electromagnetic wave energy (e.g., 12 GeV or higher electrons) and high particle energy (e.g., 50 GeV or higher protons).

A non-limiting, exemplary aspect of an embodiment of the present invention provides a glass system for detection of radiation, comprising:

one or more compounds that oscillate between a first state and a second state due to absorption of high energy, with the oscillations preventing solarization of the glass system for reuse while generating scintillations within a visible spectrum of the electromagnetic spectra for determining existence of high energy;

the generation of scintillations have a duration that is commensurate with a duration of the irradiation of the glass system, and cease when irradiation is ceased without affecting the glass system.

Another non-limiting, exemplary optional aspect of an embodiment of the present invention provides a glass system for detection of radiation, wherein one or more compounds are selected from a group comprising:

$CeO_2$, $CeF_4$, $Lu_2O_3$, $LuF_3$.

Another non-limiting, exemplary optional aspect of an embodiment of the present invention provides a glass system for detection of radiation, further comprising:

barium metaphosphate $Ba(PO_3)_2$ in mol %, aluminum metaphosphate $Al(PO_3)_3$ in mol %, and fluorides;

where the fluorides include both $BaF_2$ and RFx in mol %, and dopants selected from a group comprising $CeO_2$, $CeF_4$, $Lu_2O_3$, $LuF_3$;

where R is selected from a group comprising: Mg, Ca, Sr, Pb, Y, Bi, Al, and subscript x is an index representing an amount of fluoride (F) in the compound $RF_x$.

Another non-limiting, exemplary optional aspect of an embodiment of the present invention provides a glass system for detection of radiation, further comprising:

barium metaphosphate $Ba(PO_3)_2$ in mol %, aluminum metaphosphate $Al(PO_3)_3$ in mol %, and fluorides;

where the fluorides include:

barium fluoride $BaF_2$ in mol %;

magnesium fluoride $MgF_2$ in mol %; and

RFx in mol %, and dopants selected from a group comprising: $CeO_2$, $CeF_4$, $Lu_2O_3$, $LuF_3$;

where R is selected from a group comprising: Ca, Sr, Pb, Y, Bi, Al, La and subscript x is an index representing an amount of fluoride (F) in the compound $RF_x$.

Another non-limiting, exemplary optional aspect of an embodiment of the present invention provides a glass system for detection of radiation, further comprising:

dopant/co-dopants from Lanthanide metals selected from a group comprising:

$La_2O_3$, $LaF_3$, $Pr_2O_3$, $PrF_3$, $Nd_2O_3$, $NdF_3$, $Pm_2O_3$, $PmF_3$, $Sm_2O_3$, $SmF_3$, $Eu_2O_3$, $EuF_3$, $Gd_2O_3$, $GdF_3$, $Tb_2O_3$, $TbF_3$, $Dy_2O_3$, $DyF_3$, $Ho_2O_3$, $HoF_3$, $Er_2O_3$, $ErF_3$, $Tm_2O_3$, $TmF_3$, $Yb_2O_3$, $YbF_3$.

Another non-limiting, exemplary optional aspect of an embodiment of the present invention provides a glass system for detection of radiation, further comprising:

dopants/co-dopants from Transition metals selected from a group comprising: CuO, $CuF_2$, $TiO_2$, $TiF_4$, $Cr_2O_3$, $CrF_6$, $MO_2O_3$, $MoF_6$, $W_2O_3$, $WF_6$, $MnO_2$, $MnF_4$, $Co_2O_3$, $CoF_6$, $Ni_2O_3$, $NiF_6$.

A non-limiting, exemplary aspect of an embodiment of the present invention provides a glass system for detection of radiation, comprising:

one or more compounds having oscillatory transformative states when absorbing high energy radiation that generate scintillations within the visible spectrum while facilitating to prevent solarization of the glass.

A non-limiting, exemplary optional aspect of an embodiment of the present invention provides a glass system for detection of radiation, wherein:

one or more compounds oscillate between a first state and a second state when absorbing high energy radiation, which generate the oscillatory transformative states of the one or more compounds.

A non-limiting, exemplary aspect of an embodiment of the present invention provides a glass system, comprising:

temporary, oscillatory transformative states when absorbing high energy radiation;

wherein: the temporary, oscillatory transformative states of the glass system facilitate prevention of solarization of the glass system while generating scintillations within the visible spectrum.

A non-limiting, exemplary aspect of an embodiment of the present invention provides a fluorine resistant glass system, comprising:

barium metaphosphate $Ba(PO_3)_2$ in mol %, aluminum metaphosphate $Al(PO_3)_3$ in mol %, and fluorides;

where the fluorides include both $BaF_2$ and RFx in mol %, and where R is selected from a group comprising: Mg, Ca, Sr, Pb, Y, Bi, Al, and subscript x is an index representing an amount of fluoride (F) in the compound $RF_x$.

A non-limiting, exemplary aspect of an embodiment of the present invention provides a fluorine resistant glass system, comprising:

barium metaphosphate $Ba(PO_3)_2$ in mol %, aluminum metaphosphate $Al(PO_3)_3$ in mol %, and fluorides;

wherein the fluorides include:

barium fluoride $BaF_2$ in mol %;

magnesium fluoride $MgF_2$ in mol %; and

RFx in mol %, where R is selected from a group comprising: Ca, Sr, Pb, Y, Bi, Al, La and subscript x is an index representing an amount of fluoride (F) in the compound $RF_x$.

A non-limiting, exemplary aspect of an embodiment of the present invention provides a glass system for detection of radiation, comprising:

one or more compounds that oscillate between a first state and a second state due to absorption of high energy, with the oscillations facilitating prevention of solarization of the glass system for reuse while generating scintillations for determining existence of high energy;

the generation of scintillations have a duration that is commensurate with a duration of the irradiation of the glass system, and cease when irradiation is ceased without affecting the glass system.

A non-limiting, exemplary optional aspect of an embodiment of the present invention provides a glass system for detection of radiation, comprising:

barium metaphosphate $Ba(PO_3)_2$ in mol %, aluminum metaphosphate $Al(PO_3)_3$ in mol %, and fluorides;

where the fluorides include:

barium fluoride $BaF_2$ in mol %;

magnesium fluoride $MgF_2$ in mol %; and

RFx in mol %, and dopants;

where R is selected from a group comprising: Ca, Sr, Pb, Y, Bi, Al, La and subscript x is an index representing an amount of fluoride (F) in the compound $RF_x$.

A non-limiting, exemplary optional aspect of an embodiment of the present invention provides a glass system for detection of radiation, wherein:

the dopants and or co-dopants are selected from a group comprising:

$La_2O_3$, $LaF_3$, $CeO_2$, $CeF_4$, $Pr_2O_3$, $PrF_3$, $Nd_2O_3$, $NdF_3$, $Pm_2O_3$, $PmF_3$, $Sm_2O_3$, $SmF_3$, $Eu_2O_3$, $EuF_3$, $Gd_2O_3$, $GdF_3$, $Tb_2O_3$, $TbF_3$, $Dy_2O_3$, $DyF_3$, $Ho_2O_3$, $HoF_3$, $Er_2O_3$, $ErF_3$, $Tm_2O_3$, $TmF_3$, $Yb_2O_3$, $YbF_3$, $Lu_2O_3$, $LuF_3$, $CuO$, $CuF_2$, $TiO_2$, $TiF_4$, $Cr_2O_3$, $CrF_6$, $Mo_2O_3$, $MoF_6$, $W_2O_3$, $WF_6$, $MnO_2$, $MnF_4$, $Co_2O_3$, $CoF_6$, $Ni_2O_3$, $NiF_6$.

A non-limiting, exemplary aspect of an embodiment of the present invention provides a method for detecting radiation, comprising:

generating oscillatory transformative states when absorbing high radiation energy, with the oscillatory transformative states resulting in scintillation within the visible spectrum.

A non-limiting, exemplary optional aspect of an embodiment of the present invention provides a method for detecting radiation, wherein:

the scintillation has a duration that is commensurate with a duration of presence of radiation, and ceasing when radiation is absent.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

DETAILED DESCRIPTION OF THE INVENTION

Figure 1:
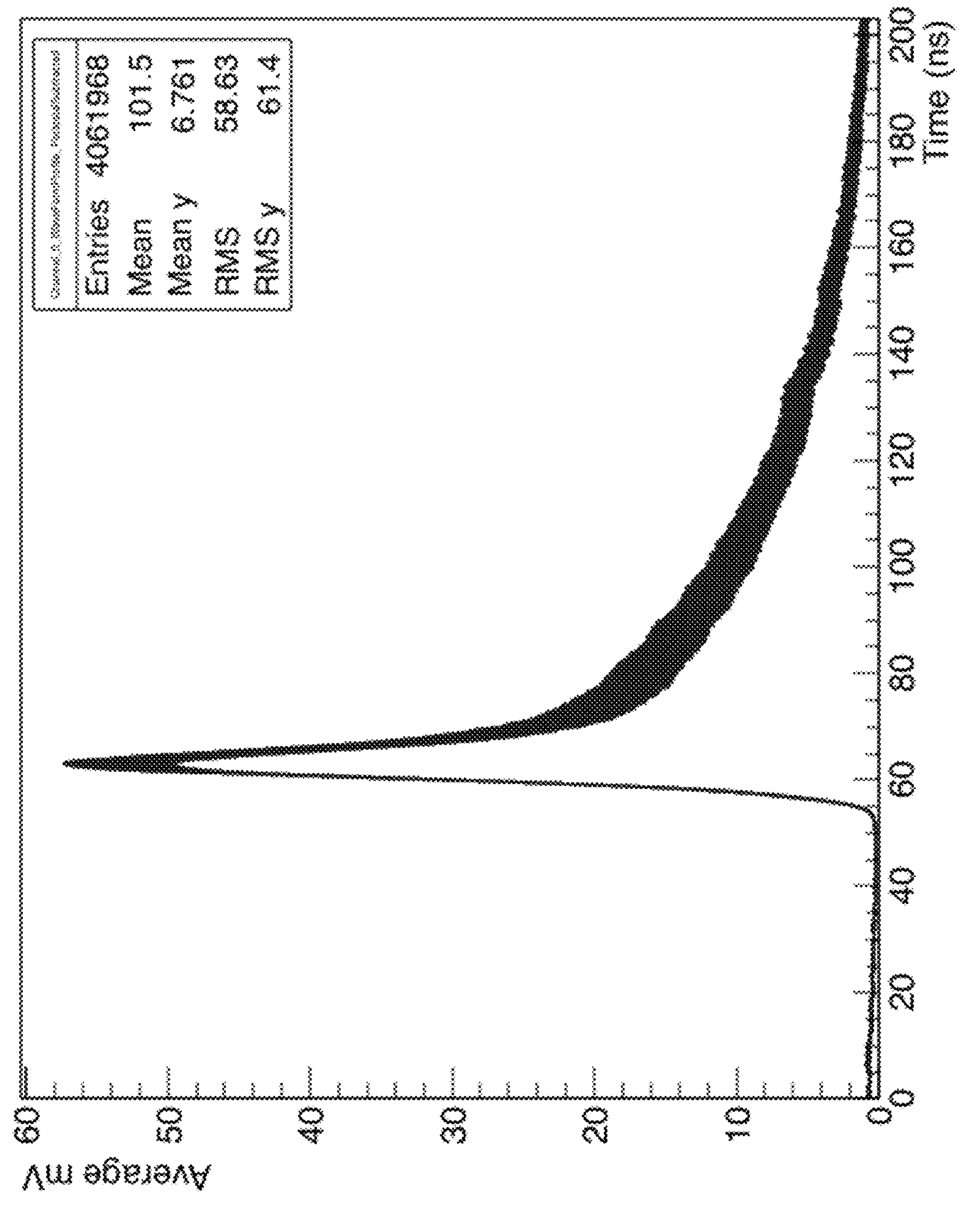
FIG. 1 is a non-limiting, exemplary illustration of a graph representing voltage (mV) verses time (ns) for scintillation decay time of glass sample (1) in accordance with one or more embodiments of the present invention.

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

The use of the phrases "and or," "and/or" throughout the specification indicate an inclusive "or" where for example, A and or B should be interpreted as "A," "B," or both "A and B."

For the sake of convenience and clarity, this disclosure uses the word "energy" in terms of both wave energy, particle energy, and mixtures thereof. Further, this disclosure defines radiation in accordance with its ordinary meaning, which is the emission of energy as electromagnetic waves or as moving subatomic particles, or mixtures thereof that may cause ionization.

Additionally, this disclosure defines high-energy wave or high Electromagnetic Radiation (EMR) or Electromagnetic Radiation Pulse (EMP) as electromagnetic waves on the high-energy end of the electromagnetic spectrum. The high-energy end of the electromagnetic spectrum is defined by electromagnetic spectra classes from at least near ultraviolet (NUV) that is at 30 THz (terahertz) or greater, such as Gamma rays (γ) at 300 EHz (Exahertz) frequencies or higher (approximately greater than $10^{19}$ Hz or higher). In addition, this disclosure defines high particle energy in terms of average neutron fluxes of at least $3\times10^9$ n/cm$^2$ sec, and average neutron fluencies of at least $2\times10^{16}$ n/cm$^2$. Further, high energy may include mixed beam and particle (protons, pions, electrons, neutrons, and gamma ray) about 13 MRad or higher. Accordingly, this invention defines the collective phrases "high energy," "high radiation," "high radiation energy," "high energy environment," "heavily irradiated environment," "high frequency electromagnetic radiation," and so on as energy or radiation defined by the above high wave energy and or high particle energy parameters.

In addition, throughout the disclosure, the words "solarize" and its derivatives such as "solarization," "solarized," and so on define the darkening, browning, and or burning up of materials due to irradiation (i.e., exposure to various amounts of applied energy (e.g., high energy)). The words "desolarize" and its derivatives such as "desolarization,"

"desolarized," and so on define the ability of a material to continuously resist (or reverse) the solarization process while exposed to high energy. The phrase "desolarizer" may be defined as agent(s) that reverse(s) the act of solarization (e.g., reverse the act of burning up or browning of the glass systems (e.g., optical component)) when in heavily irradiated environment.

Further, in addition to its ordinary meaning, transparency or derivatives thereof (e.g., transparent, etc.) may further be defined by the amount of passage of radiation energy (electromagnetic, particle, or mixtures thereof) through a glass system without distortion.

One or more embodiments of the present invention provide alkali free fluorophosphate-based glass systems that include glass compositions that are particularly useful in numerous applications, a few, non-limiting, non-exhaustive listing of examples of which may include applications in the field of lasers, amplifiers, windows, sensors (e.g., scintillators), fibers, fiber lasers, high density optical storage applications, radiation resistance, radiation shielding, radiation detection, fluorine resistance applications, and many more.

One or more embodiments of the present invention provide an alkali free fluorophosphate-based glass systems that are highly radiation resistance (for example, they do not solarize before, during, and after application of high energy radiation) and hence, are reusable and further, provide a visible means for visually determining existence of radiation. That is, the alkali free fluorophosphate-based glass systems of the present invention provide a visual indication of existence of high-energy radiation commensurate with duration of irradiation and may be reused. In other words, the alkali free fluorophosphate-based glass systems of the present invention have improved radiation resistance and radiation shielding against high energy radiation while they scintillate within the visible spectrum to provide a visible means for visually determining existence of high energy radiation. Simply stated, one or more embodiments of the alkali free fluorophosphate-based glass systems of the present invention scintillate within the visible spectrum when in high energy radiation environment while resisting and shielding against high energy radiation.

As detailed below, one or more embodiments of the present invention use dopants and or co-dopants that scintillate within the visible spectrum and hence, provide a visual indication of existence of high energy radiation without the need or requirement of additional radiation sensor apparatuses. In other words, the reusable, highly radiation resistant glass systems of the present invention include one or more sensor element (e.g., Cerium-Ce and or Lutetium Lu) that scintillates within the visible spectrum under application of high energy radiation.

One or more embodiments of the alkali free fluorophosphate-based glass systems also function to provide EMP shielding capabilities. As further detailed below, in addition to providing higher density glass systems with sensor elements that provide radiation resistance, radiation shielding, and scintillations, one or more embodiments of the present invention provide glass systems that use one or more elements (e.g., Transition metals) that may be used as dopants and or co-dopants to shield against a desired part of EM spectra pulses.

As detailed below, due to the use of five compounds as the base-composition of the glass system, one or more embodiments of the present invention provide an alkali free fluorophosphate-based glass systems that have a greater (larger) glass-forming domain for larger number of permutations for the glass formations (or types) that may be produced.

One or more embodiments of the present invention provide for an alkali free fluorophosphate-based glass systems that use compounds that result in having a larger overall Z number by element, higher density, higher refractive index $n_D$, shorter excitation decay time, and improved radiation resistance, radiation shielding, and EMP shielding. Higher density glass systems (higher number of atoms per cubic centimeter) in accordance with one or more embodiments of the present invention enable use of smaller size glass products (using much less space) with improved radiation resistance and improved radiation shielding due to higher density. That is, higher density glass systems of the one or more embodiments of the present invention function to better impede and in fact, better absorb propagation of energy passed through the glass systems due to their density, even if smaller in size.

One or more embodiments of the present invention provide for an alkali free fluorophosphate-based glass systems that are fluorine resistance. As further detailed below, one or more embodiments of the present invention provide passive alkali free fluorophosphate-based glass systems that are fluorine resistance (maintain transparency) that may be used in most water treatment plants. Because the glass system already contains fluorine in its base composition, it remains neutral (transparent, with no changes) within the fluorine environment.

Glass System (1)

In particular, one or more embodiments of the present invention provide a glass system that may be comprised of alkali free fluorophosphate-based glass systems that include:

$$\{\{Ba(PO_3)_2, Al(PO_3)_3, BaF_2, \text{ and } RF_x\} \text{ and } \{dopant\}\} \quad (1)$$

where R is selected from a group comprising: Mg, Ca, Sr, Pb, Y, Bi, Al, and subscript "x" in "$F_x$" is an index representing an amount of fluoride (F) in the compound $RF_x$, resulting in the group $MgF_2$, $CaF_2$, $SrF_2$, $PbF_2$, $YF_3$, $BiF_3$, or $AlF_3$. Further included are additional Lanthanide oxides $M_aO_b$ and or Lanthanide fluorides $MF_g$ as dopants and or co-dopants selected from Lanthanide metals over 100 wt. % of the glass base composition of glass system (1). The italic letter Min $M_aO_b$ or $MF_g$ represents a Lanthanide metal with italic subscripts a, b, and g being indexes that represent the respective amounts of Lanthanide metals (M), oxygen (O), and fluorine (F) in the compounds $M_aO_h$ and $MF_g$, resulting in the following:

$La_2O_3$, $LaF_3$, $CeO_2$, $CeF_4$, $Pr_2O_3$, $PrF_3$, $Nd_2O_3$, $NdF_3$, $Pm_2O_3$, $PmF_3$, $Sm_2O_3$, $SmF_3$, $Eu_2O_3$, $EuF_3$, $Gd_2O_3$, $GdF_3$, $Tb_2O_3$, $TbF_3$, $Dy_2O_3$, $DyF_3$, $Ho_2O_3$, $HoF_3$, $Er_2O_3$, $ErF_3$, $Tm_2O_3$, $TmF_3$, $Yb_2O_3$, $YbF_3$, $Lu_2O_3$, $LuF_3$.

The glass system (1) is highly radiation resistant (does not solarize before, during, and after application of high energy) and shields against high radiation energy, and hence, is reusable. Further, due to the use of Ce and or Lu as dopant and or co-dopant, the glass system (1) provides a visible means for visually determining existence of high energy radiation (obviously within the visible spectrum). That is, the reusable glass system (1) of the present invention provides a visual indication of the existence of high-energy radiation commensurate with duration of irradiation without the use, need, or requirement of external radiation detection components, devices, or systems. In other words, the glass system (1) uses sensor elements such as Ce and or Lu as dopants and or co-dopants that scintillate within the visible spectrum when irradiated or exposed to high energy, which provide a visual indication of the existence of radiation without the need or requirement of additional radiation sensor apparatuses. Glass systems (1) have improved radiation resistance as well as improved shielding against high energy radiation while they scintillate within the visible spectrum to provide a visible means for visually determining existence of high energy radiation.

Table I below is a non-limiting, non-exhaustive exemplary listing of preferred sample ranges for the alkali free fluorophosphate glass system (1) composition that are highly radiation resistant and shield against high energy radiations and provide a visual means of detecting existence of high energy radiation within the visible spectrum due to their ability to scintillate within the visible spectrum.

TABLE I

| Base Composition of Glass System (1) (mol %) | | | | Dopant and or Co-dopant (wt %) |
|---|---|---|---|---|
| $Ba(PO_3)_2$ | $Al(PO_3)_3$ | $BaF_2$ | $RF_x$ | Over 100% |
| 20 | 20 | 30 | 30 | 0.1 to 25 |
| 15 | 15 | 35 | 35 | 0.1 to 25 |
| 10 | 10 | 40 | 40 | 0.1 to 25 |
| 20 | 10 | 35 | 35 | 0.1 to 25 |
| 10 | 20 | 20 | 50 | 0.1 to 25 |
| 5 | 10 | 50 | 35 | 0.1 to 25 |

R is selected from a group comprising: Mg, Ca, Sr, Pb, Y, Bi, Al;

Sub-script x is an index representing an appropriate amount of fluorine (F) in the compound $RF_x$ (e.g., $MgF_2$, $CaF_2$, $SrF_2$, $PbF_2$, $YF_3$, $BiF_3$, $AlF_3$)

The dopant/co-dopant are over 100 wt % of the base composition of glass system (1), which may include Lanthanide metals ($M_aO_b$ and or $MF_g$) and in particular, Ce and or Lu for scintillation within visible spectrum Glass system (1) as a fluorophosphate glass has a potential for hosting a relatively large amount of rare earth dopants without clustering and a wide glass forming domain. Glass system (1) has a relatively low phonon energy (0.0856 eV), relatively low nonlinear refractive index ($n2=1.42\times10^{-13}$ esu), and relatively wide transmission range near ultraviolet (UV) up to mid infrared (IR).

Radiation resistant and radiation shielding characteristics of the glass system (1) of the present invention provide high resistance and shield against high levels of energy without solarizing (e.g., browning or darkening of the optical component—no solarization) before, during, and after irradiation. The combination of unique molecular structure, such as large atomic radius, high electro-negativity of fluorine (about 4 eV), and the reverse change of valency of Ce (IV), Lu (III) as dopant and or co-dopant enable the glass system (1) to achieve high solarization resistance and allow for visual detection of radiation without the use, need, or requirement of detection mechanisms due to scintillation of Ce and Lu within the visible spectrum when the glass systems (1) are irradiated (exposed to high energy radiation).

The incorporation of metaphosphate compounds such as $Ba(PO_3)_2$ and fluorides such as $BaF_2$ creates a glass with large atomic radius (2.53 Å for Ba), which allows the dopant to move and function within the glass matrix more freely thus creating a more efficient optical media. Additionally, the unique structure of glass allows for the dopant to be uniformly dispersed, reducing temperature gradients and distortions.

During high energy radiation exposure (e.g., the gamma ray or neutron fluxes and fluencies), the Ce or Lu create a continuing de-solarization process that enable the glass system (1) of the present invention to remain de-solarized due to Ce and Lu having a remarkably high transformation of valency (for example, of approximately 90-95% for Ce). That is, when the Ce or Lu is bombarded by the gamma, neutron or other high energy (radiation and/or particle), the transformation of the valency of Ce and Lu from Ce(IV) to Ce(III) and vice versa (or Lu(III) to Lu(II) and vice versa) constantly reoccurs, which allows the glass matrix to remain de-solarized while scintillating within the visible spectrum of the EM spectra in accordance with the following:

$$Ce(IV)+hv+e \leftrightarrow Ce(III)-hv-e$$

$$Ce(IV)+e \leftrightarrow Ce(III)-e$$

$$Ce(IV) \leftrightarrow Ce(III)$$

and $$Lu(III)+hv+e \leftrightarrow Lu(II)-hv-e$$

$$Lu(III)+e \leftrightarrow Lu(II)-e$$

$$Lu(III) \leftrightarrow Lu(II)$$

where hv is the environmental energy, with h as the Planck Constant and v as a frequency, and e is an electron. In other words, the peak absorption level of Ce and or Lu compounds within the optical component varies as a result of continuing transformation of a valency of Ce from Ce(IV) to Ce(III), and Ce(III) to Ce(IV) or transformation of a valency of Lu from Lu(III) to Lu(II), and Lu(II) to Lu(III).

In order for Ce (IV) to become ionized and to create the transformation process of Ce (IV) to Ce (III) and vice versa, only a minimum of about 3.6 eV (electron volt) energy is required (at 340 nm wavelength or shorter). Ce(IV) is Ce that is combined with oxygen or fluoride in the form of $CeO_2$, $CeF_4$ in its normal state, and Ce(III) is the result of Ce(IV) gaining an electron as a result of excitation of the dopant due to application of radiation.

In order for Lu (III) to become ionized and to create the transformation process of Lu (III) to Lu (II) and vice versa, only a minimum of about 4.1 eV (electron volt) energy is required (at 300 nm wavelength or shorter). Lu(III) is Lu that is combined with oxygen or fluoride in the form of $Lu_2O_3$, $LuF_3$ in its normal state, and Lu(II) is the result of Lu(III) gaining an electron as a result of excitation of the dopant due to application of radiation.

Wavelengths starting from 380 nm or shorter (e.g., to high levels of X-Ray and Gamma ray) are capable of producing the required 3.6 eV or higher for the Ce (IV) or Lu(III) dopant to achieve the continuous reciprocating transformation, thereby, maintain the glass transparent (i.e., de-solarized) and scintillating in high energy environments.

The Electron Volt Energy for each Wavelengths can be measured by utilizing the following formula:

$$E = hf = \frac{hc}{\lambda} = \frac{1240\text{ nm}}{\lambda}\text{eV}$$

Where E is energy, f is frequency, λ is the wavelength of a photon, h is Planck's Constant and is c is the speed of light.

As indicated above, one or more embodiments of the present invention provide an alkali free fluorophosphate-based glass systems that also functions to provide EMP shielding capabilities. That is, in addition to providing higher density glass systems with sensor elements that provide radiation resistance, shielding, and scintillations, one or more embodiments of the present invention provide glass systems that use one or more elements (e.g., Transition metals) that may be used to shield against a selected part of EM spectra pulses. Accordingly, the alkali free fluorophosphate-based glass system (1) may include additional co-dopants of oxides and or fluorides of Transition metals selected from the group Cu, Ti, Cr, Mo, W, Mn, Co, Ni to provide the added function of shielding against a desired part of EM spectra pulses.

Addition of Transition metals to glass system (1) enables shielding against EM pulses. That is, Transition metals may be used instead of Lanthanide metals such as Ce and or Lu as dopants and or co-dopants or, alternatively, Transition metals may be used in combination with Lanthanide metals such as Ce and or Lu. In other words, dopants and or co-dopants may comprise of a group that include the oxides and or fluorides of Transition metals CuO, $CuF_2$, $TiO_2$, $TiF_4$, $Cr_2O_3$, $CrF_6$, $Mo_2O_3$, $MoF_6$, $W_2O_3$, $WF_6$, $MnO_2$, $MnF_4$, $Co_2O_3$, $CoF_6$, $Ni_2O_3$, $NiF_6$, oxides of Lanthanide metals ($M_aO_b$), and or fluorides of Lanthanide metals ($MF_g$) over 100 wt. % of the glass base composition of glass system (1). For example, use of the Transition metal Ti as co-dopant in combination with Lanthanide Ce as dopant within the above glass system (1) would enable scintillation of the glass system (1) when irradiated and further, shield against UV pulses of the EM spectra. Accordingly, various combinations of Transition metals may be used as dopants and or co-dopants to shield against desired parts of the electromagnetic spectra pulses and or as co-dopants with dopant Ce and or Lu for scintillations within the visible spectrum in addition to shielding EMP. It should be noted that various combinations of other Lanthanide metals may also be used as additional co-dopants in addition to Transition metals, however, at the very least, the glass system (1) must include as dopants 0.1 wt % of Ce and or Lu for scintillations within the visible spectrum when irradiated. In other words, to have scintillations within the visible spectrum, dopant may comprise of at least 0.1 wt % of Ce and or Lu, with the co-dopants of up to 24.9 wt % comprising one or more combinations of Lanthanide metals, one or more combinations of Transition metals, and or one or more combinations of Lanthanide metals and or Transition metals.

For the base composition of glass system (1), use of $PbF_2$ or $BiF_3$ is preferred as the $RF_x$, of base composition of glass system (1). $PbF_2$ or $BiF_3$ increase the overall Z number of the glass system (1) by element and hence, its density by the largest number, which facilities to lower decay time of Lanthanide metals Ce, Lu when used as dopants and or co-dopants, while also improving resistance to high energy radiation. A lower or shorter decay time of an excited element such as Ce increases the frequency by which various particles (e.g., nuclear particles with short life-time) may be detected.

The following is a non-limiting, specific example of glass system (1):

Example 1 aluminum metaphosphate $Al(PO_3)_3$, from 5 to 60 mol percent;

barium metaphosphate $Ba(PO_3)_2$, from 5 to 60 mol percent;

fluorides $BaF_2$ and $RF_x$, 10-70 mol percent; and dopant comprised of oxides and fluorides 0.1-25 wt % selected from a group comprising of rare earth and or Transition elements, including Ce, Lu, Cu, Ti, Cr, Mo, W, Mn, Co, Ni, and or mixtures thereof over 100 wt % of the base composition.

where:

R is selected from the group comprising of Mg, Ca, Sr, Pb, Al, Y, and Bi; and x is an index representing an amount of fluoride (F) in the compound $RF_x$.

Tests were conducted on the following, non-limiting, exemplary glass sample composition of glass system (1), comprising:

Glass Sample (1)

aluminum metaphosphate $Al(PO_3)_3$, 15 mol percent;

barium metaphosphate $Ba(PO_3)_2$, 15 mol percent;

fluorides that are comprised of:

$BaF_2$, 35 mol percent;

$RF_x=MgF_2$, 35 mol percent; and dopant comprised of $CeO_2$ 1% wt over 100 wt % of the base composition of glass sample (1).

The tests were conducted in high energy radiation environments with results that glass sample (1) did not solarize (remained transparent) and generated scintillations while being irradiated. After 13 Mrad of $^{137}Cs$ (633 KeV) of irradiation, no change in measured properties of the glass sample (1) were detected with respect to integrated light output, speed of emission, light transmission (errors±3% estimated systematic, <±1% statistical). The measurements for the irradiation were as follows:

Electrons (12 GeV) and Protons (50 GeV) were sent into the glass sample (1).

The glass sample (1) was coupled to a fast photomultipliers via quartz fiber bundles Photomultipliers integrated light from ~360 nm to 650 nm (2%-2% quantum efficiency region)

Figure 2:
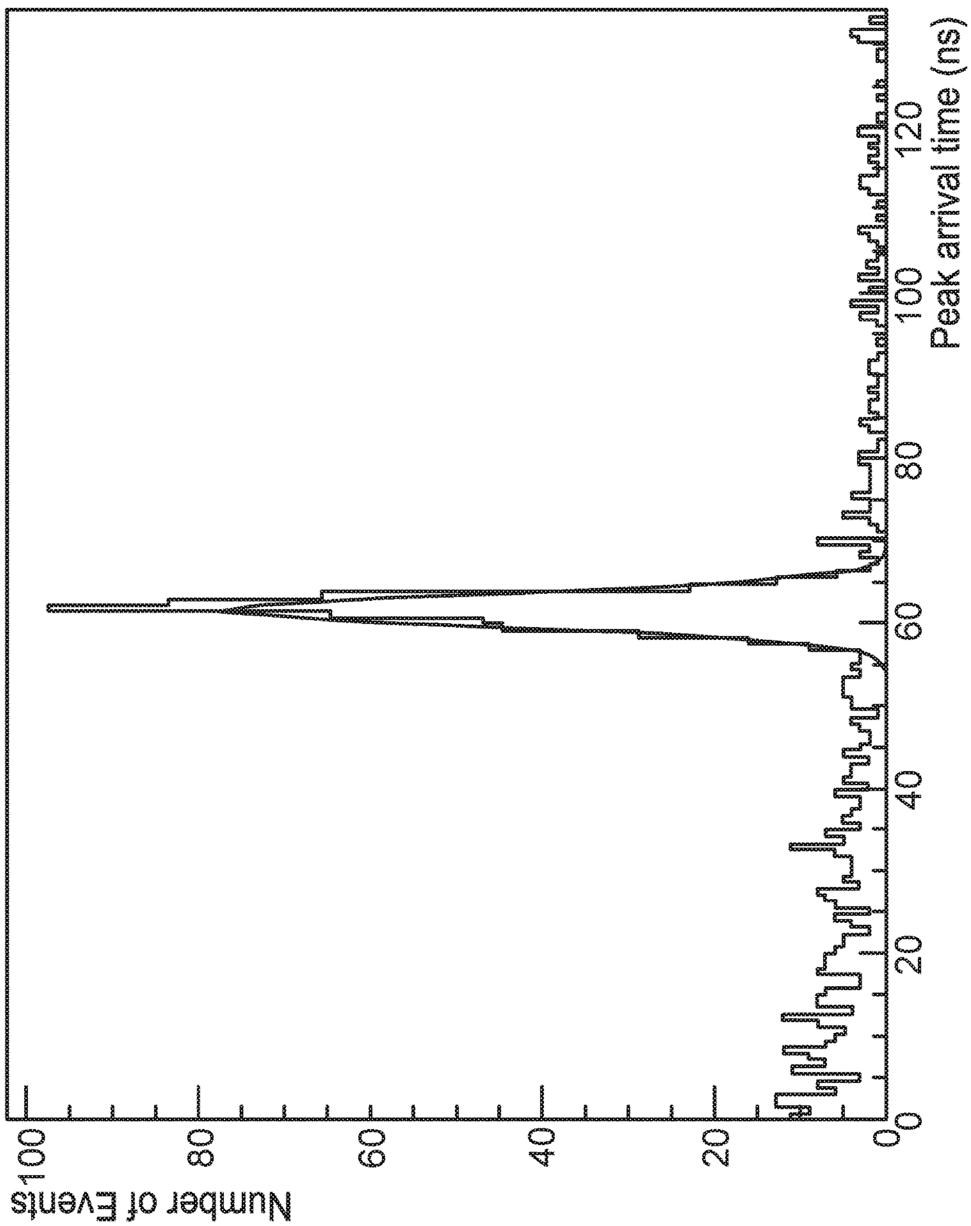
FIG. 2 is a non-limiting, exemplary illustration of a graph that represents number of events versus peak arrival time (ns) of glass sample (1) in accordance with one or more embodiments of the present invention; with FIG. 2A a non-limiting, exemplary illustration of glass sample (1) scintillating at 450 to 550 nm when excited at 288 nm to 380 nm in accordance with one or more embodiments of the present invention.

The glass sample (1) was again irradiated up to a minimum of 99 Mrad in 3 more expose/measure cycles (of mixture of 12 GeV electron and 50 GeV protons) with the results shown in graphs of FIGS. 1 and 2. Glass sample (1) withstood high-energy irradiations of mixture of high electromagnetic wave energy (e.g., 12 GeV or higher electrons) and high particle energy (e.g., 50 GeV or higher protons). FIG. 1 is a graph representing voltage (mV) verses time (ns), and FIG. 2 represents number of events versus peak arrival time (ns). As illustrated in FIG. 1, the pulse shape (Voltage vs Time) averaged over 4 million protons through the above glass sample (1). The histogram of scintillation pulse arrival time (FIG. 2): number of events per 0.2 ns vs time in ns. A Gaussian fit well characterizes the data with a fitted time resolution $\sigma_t$=±1.98 ns. Removing the phototube rise time (about 1.1 ns) in quadrature, resulted in a time resolution of ±1.6 ns.

Mixed Beam and Particle (protons; pions; electrons; neutrons and gamma rays) resulting from a 22 GeV proton beam incident on a metal target: estimated dose is bracketed by 10 MRad<Dose<100 MRad. Additional Dosages of 13 MRad of 633 KeV$^{137}$Cs X-rays were administered twice. This glass (glass sample (1)) has radiation resistance capabilities of at least 99 MRad of 633 KeV$^{137}$Cs X-rays. The scintillation (for Ce 1 wt %) is estimated to be at least 10 photons/KeV. The time structure of the light emission shows 2 exponentials of about ~5-6 ns and ~35 ns. Half the photons are emitted in ~40 ns.

As indicated above, no change in the properties of glass sample (1) were detected post irradiation. Further, decay times of 19 ns to 50 ns (for Ce) observed were at least three times faster than for example, the required 150 ns long pulse for gamma/neutron interrogation of large cargo. In fact, given the observed decay time of about 19 ns to 50 ns, glass sample (1) may be used with Computed Tomography (CAT) like scanning devices, which operate at about 6 MHz data rate.

Figure 2A:
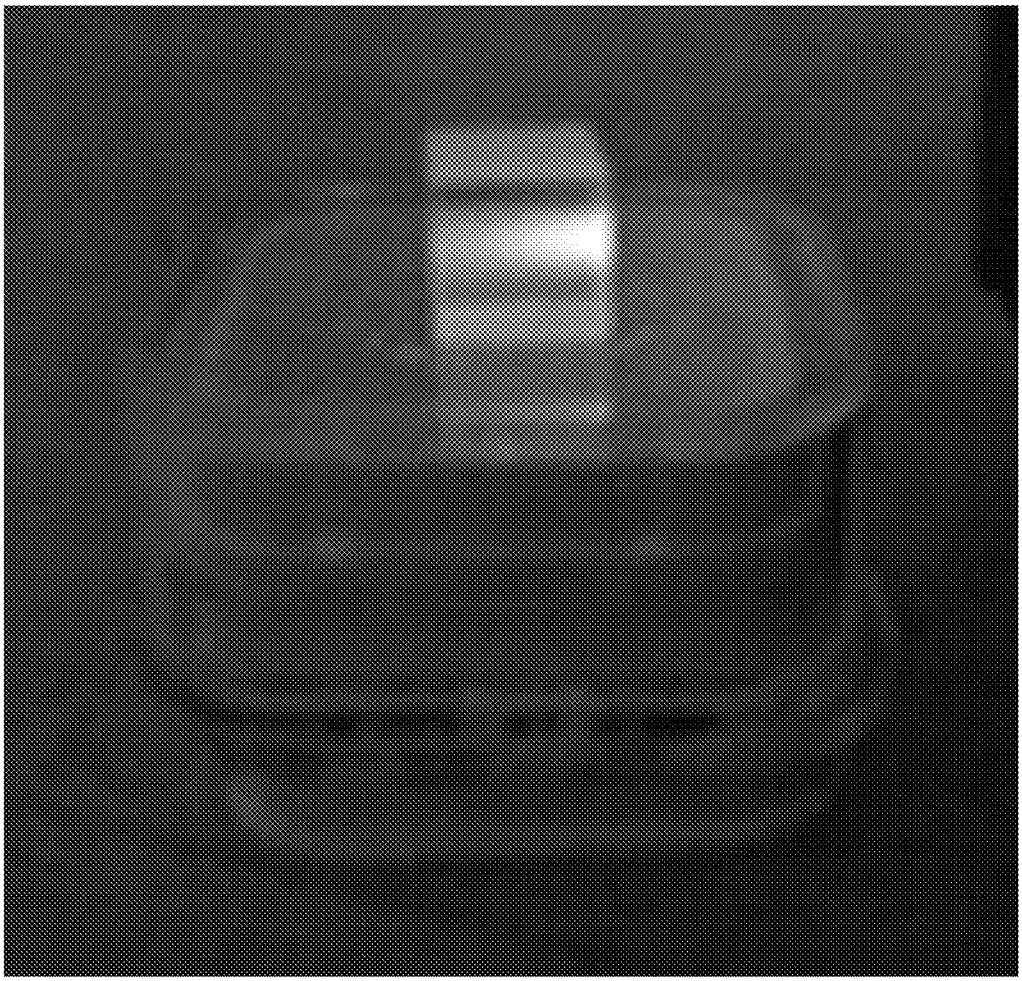

As to scintillations of glass sample (1) due to use of Ce dopant, the light output observed was 2 to 3 times more than conventional plastic scintillates, as best illustrated in FIG. 2A. FIG. 2A is a non-limiting, exemplary illustration of glass sample (1) scintillating at 450 to 550 nm when excited at 288 nm to 380 nm. It should be noted that increasing the amount of Ce dopant in glass sample (1) improves the overall performance of the glass system. For example, light output of 1 wt % $CeO_2$ dopant due to scintillations is about 310 ph/MeV in visible spectrum whereas the light output of 5 wt % $CeO_2$ dopant is about 750 ph/MeV. This make glass sample (1) sufficient for use with portable or fixed radiation warning detectors, reactor and nuclear waste monitoring, and especially, biomedical/pharma instrumentation such as gamma cameras, micro-wells, Scanning Electron Microscopy (SEM) analytical, and genetic/protein sequencing, and high energy cargo scanning.

Figure 3A:
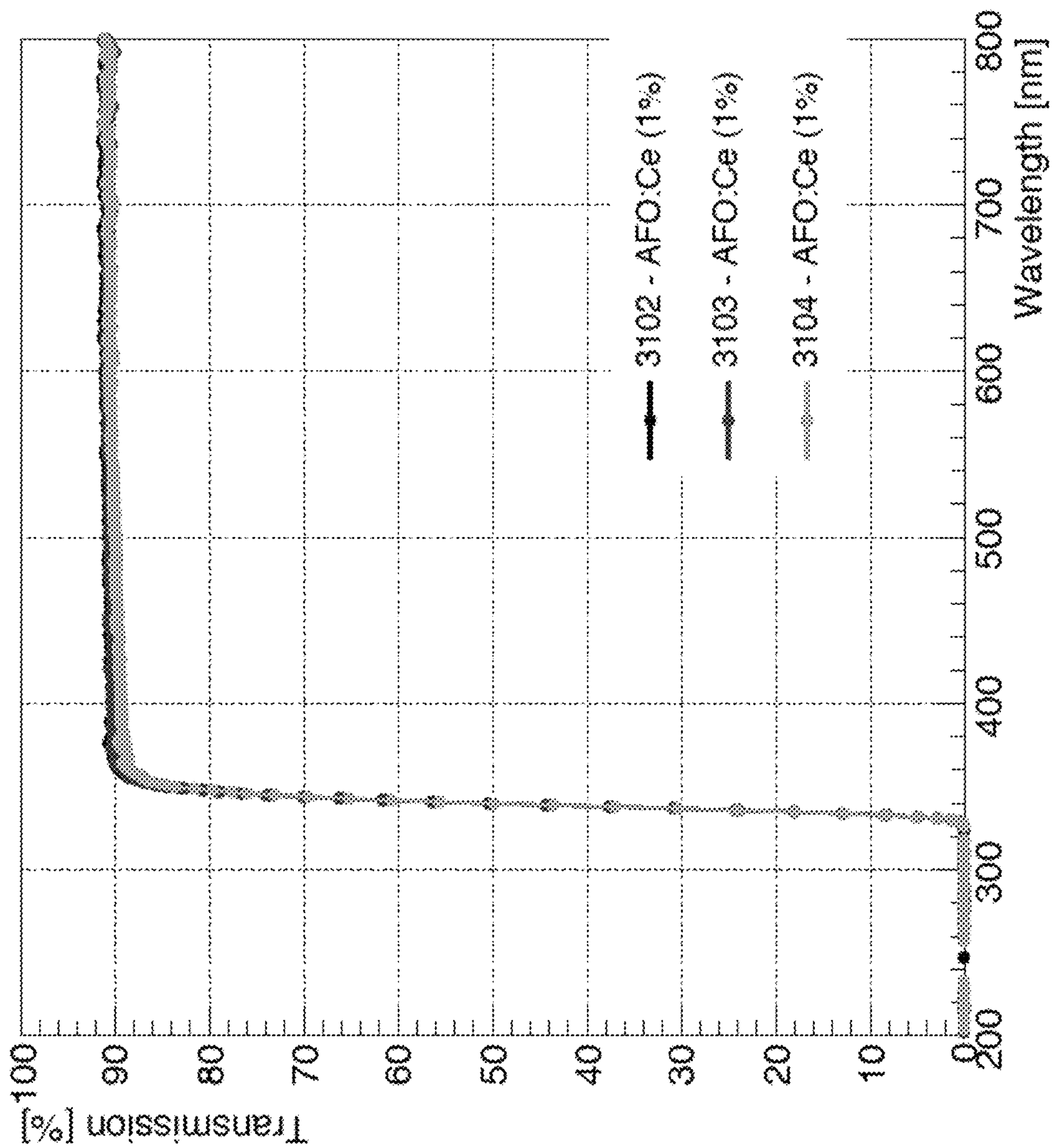
FIGS. 3A to 3C are non-limiting, exemplary graphs that are related to transmission, relative intensity, and normalized intensity of scintillations and decay times of glass sample (1) in accordance with one or more embodiments of the present invention.
Figure 3B:
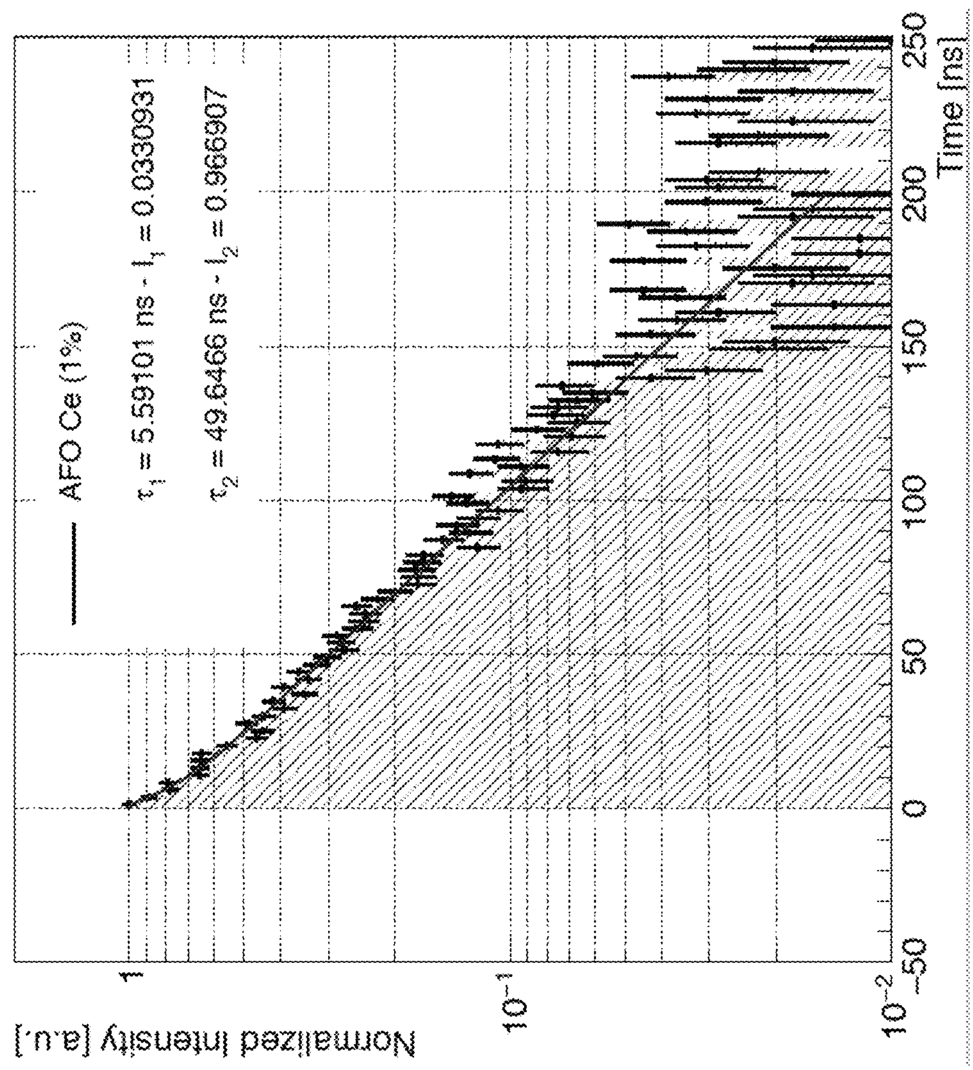
Figure 3C:
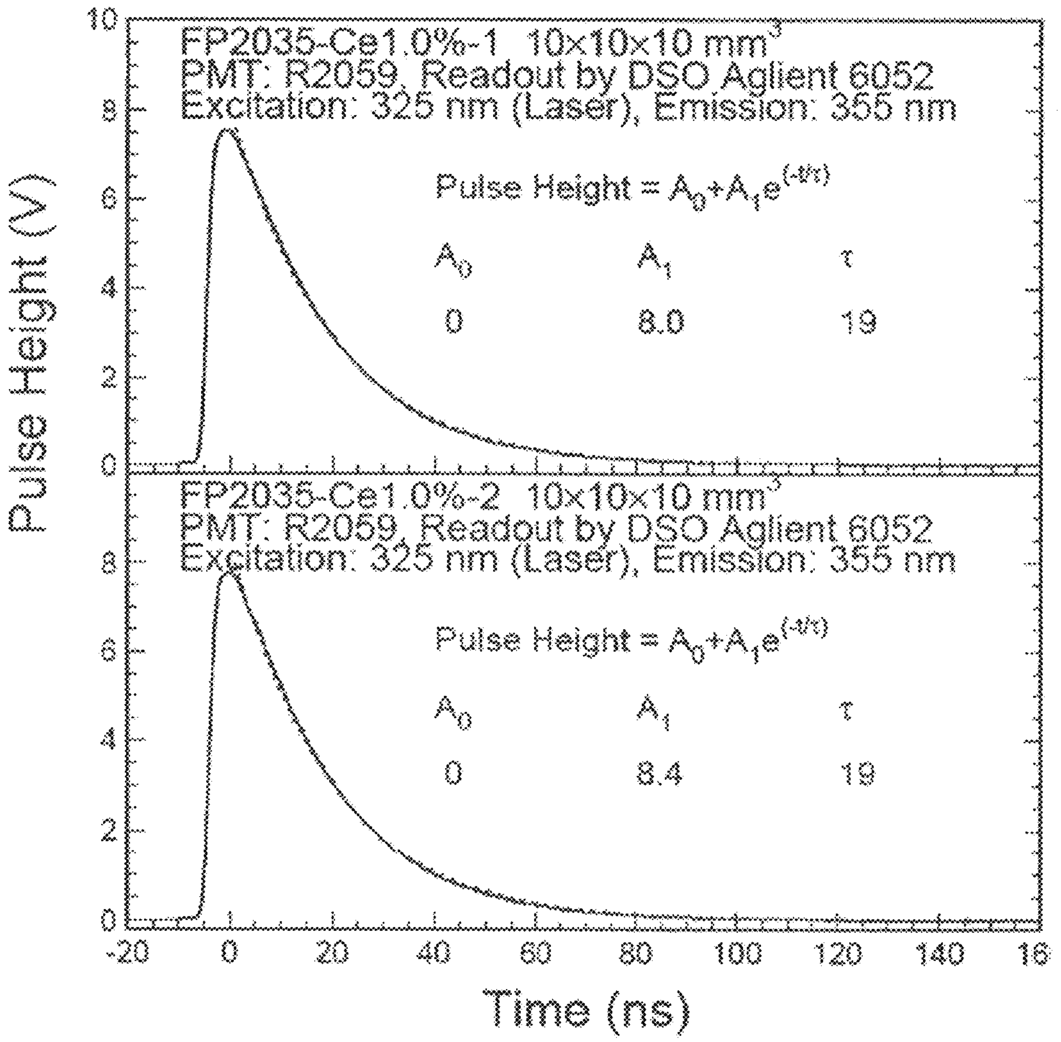

FIGS. 3A to 3C are non-limiting, exemplary graphs that are related to scintillations and decay times of the glass sample (1). FIG. 3A illustrates the transparency spectrum measured by spectrophotometer, detailing the transmission curves for three identical specimens of glass sample (1). As illustrated, all three specimens have good transmission—well over 90% transparency. It should be noted that the higher the transparency of a glass, the wider the range of wavelengths of the electromagnetic spectra within which dopants may operate to generate observable scintillations (visible or otherwise). For example, certain dopants scintillate at a specific wavelength only, which may be outside of the range of wavelength that may be accommodated by the poor transparency of a conventional glass and hence, not be observable.

FIG. 3B is a graph that illustrates the measurements of decay time (of $CeO_2$ 1 wt % for glass system (1)) using single photon counting technique, with the instrument response subtracted. As illustrated, in this specific, non-limiting example the main decay component in accordance with this particular technique is about 50 ns. However, as illustrated in FIG. 3C, the same glass system (1) when excited at 325 nm wavelength (laser), the decay time was found to be about 19 ns.

Glass System (2)

One or more embodiments of the present invention provide an alkali free fluorophosphate-based glass system that is comprised of:

$$\{\{Ba(PO_3)_2, Al(PO_3)_3, BaF_2, MgF_2, \text{ and } RF_x\} \text{ and } \{dopant\}\} \quad (2)$$

where R is selected from a group comprising: Ca, Sr, Pb, Y, Bi, Al, La and subscript "x" in "$F_x$" is an index representing an amount of fluoride (F) in the compound $RF_x$, resulting in the group $CaF_2$, $SrF_2$, $PbF_2$, $YF_3$, $BiF_3$, $AlF_3$, $LaF_3$. Further included are additional Lanthanide oxides $M_aO_b$ and or Lanthanide fluorides $MF_g$ (as defined above) as dopants and or co-dopants selected from Lanthanide metals over 100 wt. % of the glass base composition of glass system (2).

Glass system (2) has a glass base composition $\{Ba(PO_3)_2$, $Al(PO_3)_3$, $BaF_2$, $MgF_2$, and $RF_x\}$, which is comprised of five compounds instead of four compounds of glass system (1), which greatly improves the overall glass properties. For example, the five compound glass base composition of glass system (2) provides a greater (larger) glass-forming domain for larger number of permutations for the glass formations (or types) that may be produced compared to the four compound glass system (1). As other examples, the five compound glass base composition of glass system (2) has a larger overall Z number of about 56 to 60 by element, has higher density of about 4.6 to 5.4 g/cc, shorter excitation decay time of about 19 ns to 50 ns, and improved radiation resistance and radiation shielding (due to higher density).

In particular, it should be noted that the use of $MgF_2$ in addition to $RF_x$ facilitates favorable glass-forming criteria, which drastically increases glass-forming domain and as a result, the glass-forming ability of the glass system (2). That is, $MgF_2$ in particular, provides a wider glass forming domain from which larger number of permutations of various glass formations (or types) may be produced. In other words, the compound $MgF_2$ of the glass base composition increases the glass forming ability of the composition of glass system (2).

The alkali free fluorophosphate-based glass system (2) is highly radiation resistance (does not solarize before, during, and after application of high radiation energy) and hence, is reusable. Glass system (2) has improved radiation resistance as well as improved radiation shielding against high energy radiation. Further, due to the use of dopant and or co-dopant Ce and or Lu, the alkali free fluorophosphate-based glass system (2) provides a visible means for visually determining existence of high energy radiation within the visible spectrum. That is, the reusable alkali free fluorophosphate-based glass system (2) of the present invention provides a visual indication of existence of high-energy radiation commensurate with duration irradiation without the use, need, or requirement of external radiation detection components, devices, or systems. In other words, the glass system (2) uses sensor elements such as Ce and or Lu as dopants and or co-dopants that scintillate within visible spectrum when irradiated or exposed to high energy radiation, which provide a visual indication of existence of radiation without the need or requirement of additional radiation sensor apparatuses.

Table II below is a non-limiting, non-exhaustive exemplary listing of preferred sample ranges for the alkali free fluorophosphate glass system (2) composition that are highly radiation resistant and shield against high energy radiation and provide a visual means of detecting existence of high energy radiation due to their ability to scintillate within the visible spectrum (if Ce and or Lu are used as dopants and or co-dopants).

TABLE II

| Base Composition of Glass System (2) (mol %) | | | | | Dopant and or Co-dopant (wt %) |
|---|---|---|---|---|---|
| $Ba(PO_3)_2$ | $Al(PO_3)_3$ | $BaF_2$ | $MgF_2$ | $RF_x$ | Over 100% |
| 15 | 10 | 30 | 30 | 15 | 0.1 to 25 |
| 20 | 10 | 20 | 25 | 25 | 0.1 to 25 |
| 10 | 10 | 20 | 30 | 30 | 0.1 to 25 |
| 10 | 10 | 30 | 30 | 20 | 0.1 to 25 |
| 15 | 10 | 30 | 40 | 5 | 0.1 to 25 |
| 20 | 10 | 25 | 35 | 10 | 0.1 to 25 |

R is selected from a group comprising: Ca, Sr, Pb, Y, Bi, Al;

Sub-script x is an index representing an appropriate amount of fluorine (F) in the compound $RF_x$ (e.g., $CaF_2$, $SrF_2$, $PbF_2$, $YF_3$, $BiF_3$, $AlF_3$)

The dopant and/or co-dopant are over 100 wt % of the glass base composition of glass system (2), which may include - Lanthanide metals ($M_aO_b$ and or $MF_g$), Transition metals, and or a combination of Lanthanide metals ($M_aO_b$ and or $MF_g$) and or Transition metals (and in particular, Lanthanide metals such as $CeO_2$, $CeF_4$, $Lu_2O_3$, $LuF_3$ if scintillation is desired within visible spectrum)

Similar to glass system (1), the radiation resistant characteristics of the glass system (2) of the present invention provide high resistance and shield against high levels of energy without solarizing (e.g., browning or darkening of the optical component—no solarization) before, during, and after irradiation. Similar to glass system (1), the combination of unique molecular structure, such as large atomic radius, high electro-negativity of fluorine, and the reverse change of valency of Lanthanide metals dopant enable the glass system (2) to achieve high solarization resistance and allows for visual detection of radiation (if Ce and or Lu are used as dopant and or co-dopants) without the use, need, or requirement of detection mechanisms due to scintillation of Ce, Lu dopant within the visible spectrum when the glass systems (2) is exposed to high energy radiation.

It should be noted that the reverse change of valency of Lanthanide metals other than Ce or Lu also enable the glass system (2) to achieve high solarization resistance and allows for detection of radiation, but outside the visible spectrum. In other words, scintillations are also generated if Lanthanide metals other than Ce or Lu are used as dopant and or co-dopant, but the generated scintillations are generally outside of the visible spectrum of the electromagnetic spectra. As a non-limiting example, due to reverse change of valency, the Lanthanide metal Yb scintillates within the infrared spectrum.

As with glass system (1), during high energy radiation exposure (e.g., the gamma ray or neutron fluxes and fluencies), the Lanthanide metals as dopant of glass system (2) create a continuing de-solarization process that enable the glass system (2) of the present invention to remain de-solarized due to the Lanthanide metals dopants having a remarkably high transformation of valency of approximately 90-95% for Ce. That is, when Lanthanide metals used as dopants and or co-dopants within glass system (2) are bombarded by the gamma, neutron or other high energy (radiation and or particle), the transformation of the valency of the Lanthanide metals constantly reoccurs, which allows the glass matrix to remain de-solarized. Exemplary transformations with respect to Lanthanide metals Ce and Lu are detailed above in relation to glass system (1), which are similar to transformations of other Lanthanide metals.

Similar to glass system (1), one or more Transition metals may be used with glass system (2) to shield against selected parts of EM spectra pulses. Accordingly, the alkali free fluorophosphate-based glass system (2) may include additional co-dopants of oxides and fluorides of Transition metals selected from the group comprising Cu, Ti, Cr, Mo, W, Mn, Co, Ni to provide the added function of shielding EM pulses, similar to glass system (1).

As with glass system (1), in glass system (2) Transition metals may be used as dopants and or co-dopants instead of Lanthanide metals or, alternatively, may be used in combination with Lanthanide metals. Accordingly, various combinations of Transition metals may be used in glass systems (2) to shield against electromagnetic pulses in combination with Lanthanide metals for scintillations. As with glass system (1), to have scintillations within the visible spectrum, dopant used may comprise of at least 0.1 wt % of Ce and or Lu, with the co-dopants of up to 24.9 wt % comprising one or more combinations of Lanthanide metals, one or more combinations of Transition metals, and or one or more combinations of Lanthanide metals and or Transition metals.

As with glass system (1), the use of $PbF_2$ or $BiF_3$ in glass system (2) is also preferred as the $RF_x$, which increase the overall Z number of the glass system (2) by element and hence, its density by the largest number, which facilities to lower decay time of Lanthanide metals when used as dopants and or co-dopants, while also improving resistance to high energy radiation. Use of $CaF_2$, $SrF_2$, $YF_3$, $AlF_3$ also increase the overall Z number, but to a lesser extent. However, $CaF_2$, $SrF_2$, $YF_3$, $AlF_3$ do increase the glass forming domain (i.e., the glass-forming ability) of the glass system (2). That is, they provide a wider glass forming domain from which larger number of permutations of various glass formations (or types) may be produced. In other words, they increase the glass forming ability of the composition of glass system (2).

The following is a non-limiting, specific example of glass system (2):

Example 2 aluminum metaphosphate $Al(PO_3)_3$, from 5 to 60 mol percent;

barium metaphosphate $Ba(PO_3)_2$, from 5 to 60 mol percent;

barium fluoride $BaF_2$, from 10-40 mol percent;

magnesium fluoride $MgF_2$ and $RF_x$, 10-90 mol percent; and dopant comprised of oxides and fluorides 0.1-25 wt % percent, from a group comprising of rare earth and or Transition elements Ce, Nd, Er, Yb, Tm, Tb, Ho, Sm, Eu, Pr; Lu, Cu, Ti, Cr, Mo, W, Mn, Co, Ni, and mixtures thereof over 100 wt % of the glass base composition;

where

R is selected from the group consisting of Mg, Ca, Sr, Pb, Al, Y, and Bi; and x is an index representing an amount of fluoride (F) in the compound RFx.

Figure 4A:
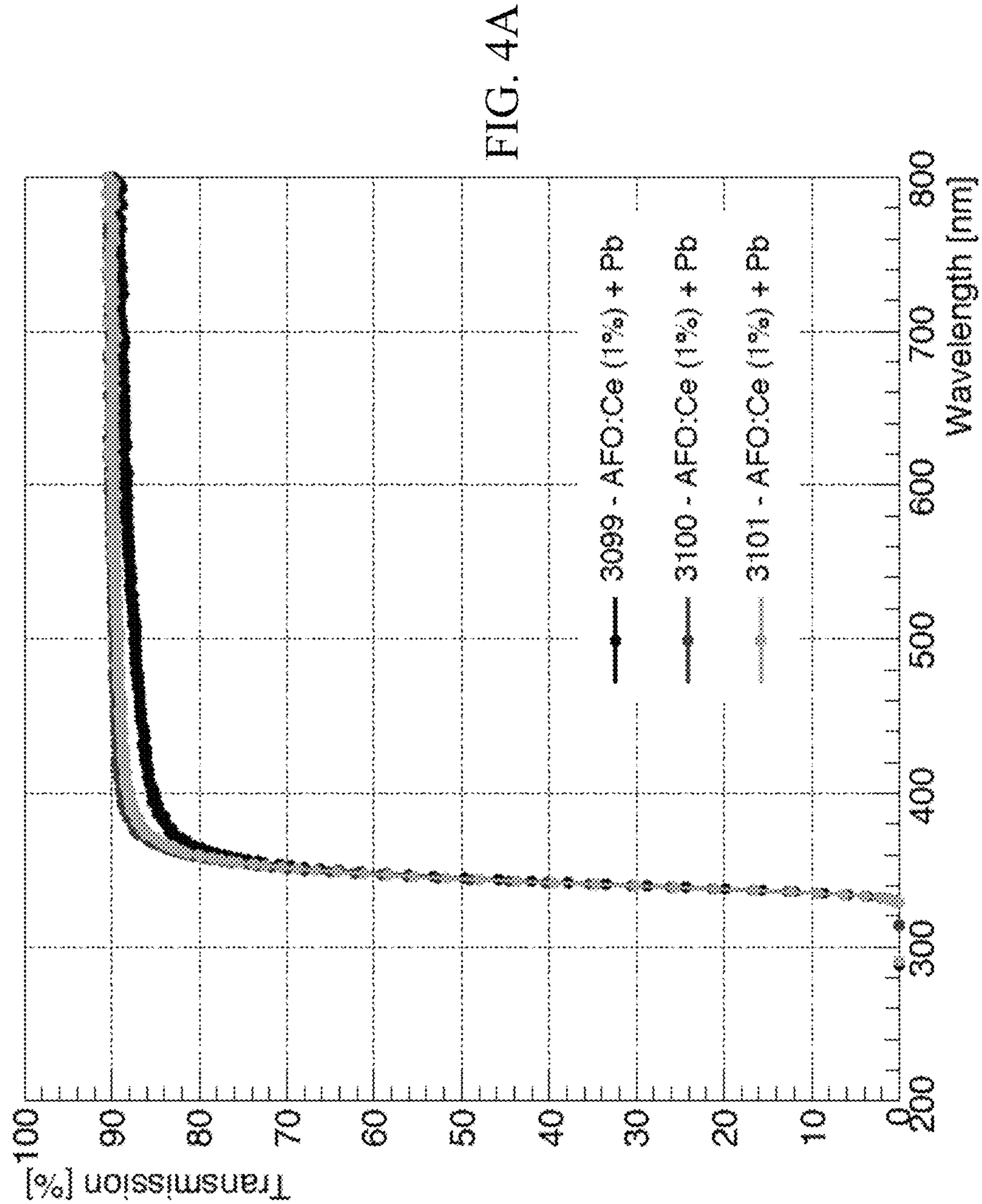
FIGS. 4A and 4B are non-limiting, exemplary graphs that are related to transmission, and normalized intensity of scintillations and decay times of glass sample (2) in accordance with one or more embodiments of the present invention.
Figure 4B:
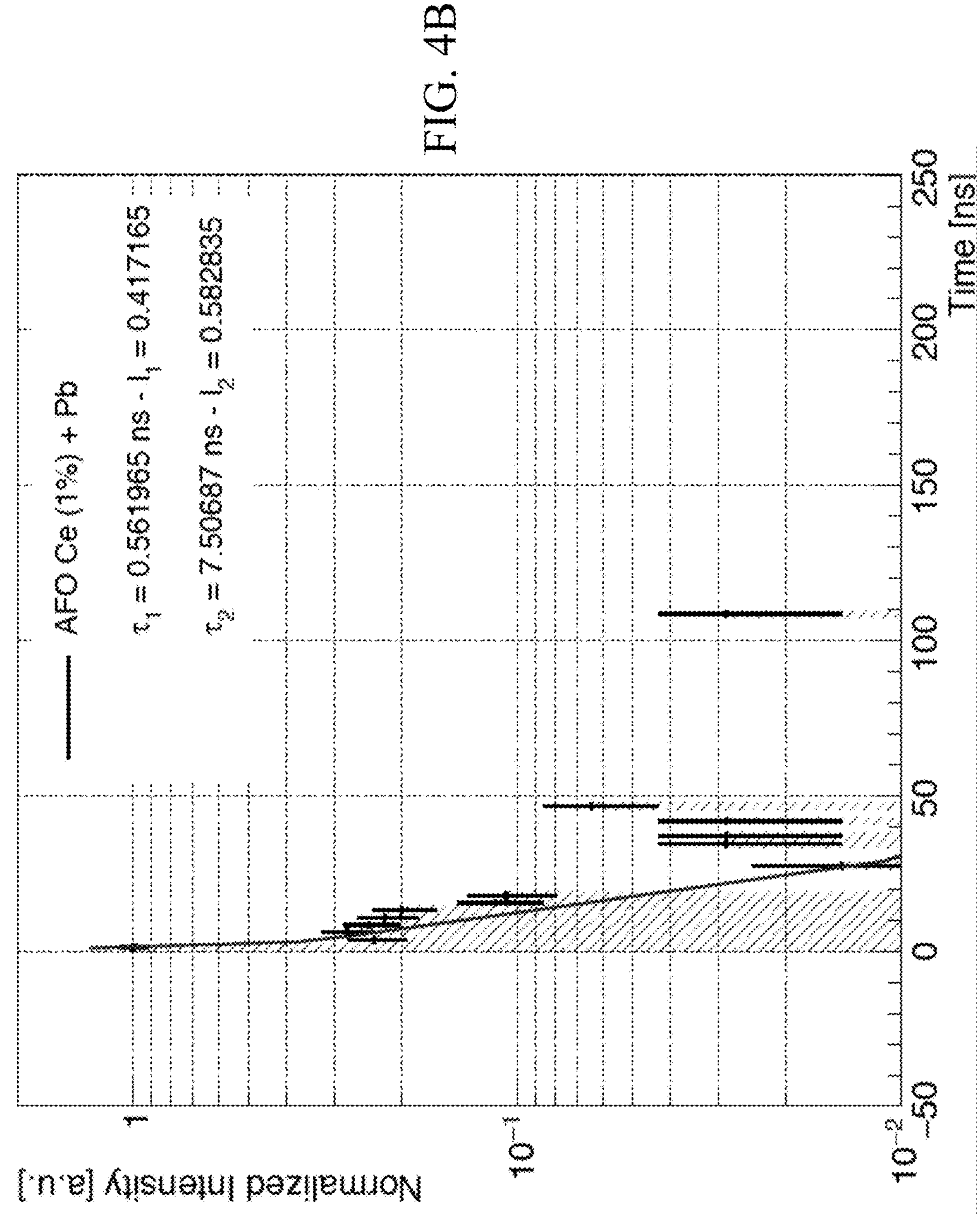

FIGS. 4A and 4B are non-limiting, exemplary graphs that related to scintillation of the glass system (2) with the following non-limiting, exemplary, glass sample composition of glass system (2), comprising:

Glass Sample (2)

aluminum metaphosphate $Al(PO_3)_3$, 10 mol percent;

barium metaphosphate $Ba(PO_3)_2$, 15 mol percent;

barium fluoride $BaF_2$, 30 mol percent;

magnesium fluoride $MgF_2$, 30 mol percent;

Lead fluoride $PbF_2$, 15 mol percent and dopant $CeO_2$ 1% wt over 100 mol % of glass base composition FIG. 4A illustrates the transparency spectrum measured by spectrophotometer, detailing the transmission curves for three identical specimens of glass sample (2). As illustrated, all three specimens have good transmission—well over 90% transparency. As indicated above, the higher the transparency of a glass, the wider the range of wavelengths of the electromagnetic spectra within which dopants may operate to generate observable scintillations (visible or otherwise). For example, certain dopants scintillate at a specific wavelength only, which may be outside of the range of wavelength that may be accommodated by the poor transparency of the glass and hence, not be observable. FIG. 4B is a graph that illustrates that Cherenkov light is dominating with a fast scintillation component (about 10 ns).

It should be noted that the use of the glass base compositions of glass system (1) and or glass system (2) with no dopants provide passive glass systems (3) and (4) that are fluorine gas resistance (maintain transparency—do not become opaque, clouded, or pitted), which may be used in most water treatment plants (e.g., nuclear facilities).

Ba(PO3)2,AI(PO3)3,BaF2, and $RF_x$ (3)

Ba(PO3)2,AI(PO3)3,BaF2,MgF2, and $RF_x$ (4)

Table III below is a non-limiting, non-exhaustive, exemplary listing of preferred sample ranges for an alkali free fluorophosphate passive glass system (3) composition (which has no dopants).

TABLE III

| Composition of Passive Glass System (3) (mol %) | | | |
|---|---|---|---|
| $Ba(PO_3)_2$ | $Al(PO_3)_3$ | $BaF_2$ | $RF_x$ |
| 20 | 20 | 30 | 30 |
| 15 | 15 | 35 | 35 |
| 10 | 10 | 40 | 40 |
| 20 | 10 | 35 | 35 |
| 10 | 20 | 20 | 50 |
| 5 | 10 | 50 | 35 |

R is selected from a group comprising: Mg, Ca, Sr, Pb, Y, Bi, Al;
Sub-script x is an index representing an appropriate amount of fluorine (F) in the compound $RF_x$ (e.g., $MgF_2$, $CaF_2$, $SrF_2$, $PbF_2$, $YF_3$, $BiF_3$, $AlF_3$)

The following is a non-limiting, specific example of passive glass system (3):

Example 3 aluminum metaphosphate $Al(PO_3)_3$, from 5 to 60 mol percent;

barium metaphosphate $Ba(PO_3)_2$, from 5 to 60 mol percent;

fluorides $BaF_2$ and $RF_x$, 10-70 mol percent; where

R is selected from the group consisting of Mg, Ca, Sr, Pb, Al, Y, and Bi; and x is an index representing an amount of fluoride (F) in the compound RFx.

Table IV below is a non-limiting, non-exhaustive, exemplary listing of preferred sample ranges for an alkali free fluorophosphate passive glass system (4) composition (which has no dopants).

TABLE IV

| Composition of Passive Glass System (4) (mol %) | | | | |
|---|---|---|---|---|
| $Ba(PO_3)_2$ | $Al(PO_3)_3$ | $BaF_2$ | $MgF_2$ | $RF_x$ |
| 15 | 10 | 30 | 30 | 15 |
| 20 | 10 | 20 | 25 | 25 |
| 10 | 10 | 20 | 30 | 30 |
| 10 | 10 | 30 | 30 | 20 |
| 15 | 10 | 30 | 40 | 5 |
| 20 | 10 | 25 | 35 | 10 |

R is selected from a group comprising: Pb, Ca, Sr, Bi, Y, Al
Sub-script x is an index representing an appropriate amount of fluorine (F) in the compound $RF_x$ (e.g., $CaF_2$, $SrF_2$, $PbF_2$, $YF_3$, $BiF_3$, $AlF_3$)

The following is a non-limiting, specific example of passive glass system (4):

Example 4 aluminum metaphosphate $Al(PO_3)_3$, from 5 to 60 mol percent;

barium metaphosphate $Ba(PO_3)_2$, from 5 to 60 mol percent;

barium fluoride $BaF_2$, from 10-40 mol percent;

magnesium fluoride $MgF_2$ and $RF_x$, 10-90 mol percent;

where R is selected from the group consisting of Ca, Mg, Pb, Al, Y, Sr and Bi; and x is an index representing an amount of fluoride (F) in the compound $RF_x$.

During tests, glass systems (3) and (4) were installed in a water plant room where fluorine gasses were present. The glass systems (3) and (4) were exposed to this environment for seven months. After the seven month period, the glasses remained transparent. This is significant in many worldwide industries (such as Water Treatment Facilities) that utilize fluorine and hydrofluoric acids.

Conventional glass, crystal or plastic products, including window panels and gauge display covers develop an opaque (cloudy/etched/pitted) layer and worsened with time when exposed to fluorine gasses. Clouded (or opaque) glass raise safety and security issues and become a prominent problem for device manufacturers and end users who operate equipment in these environments primarily because it becomes difficult to inspect rooms, view outside activity, and read instrument gauges.

Advantages of having fluorine resistant glasses of the present invention are that they greatly increase the safety standards by allowing complete visual access to equipment's operating parts (e.g., the pressure gauge readings, etc.) within the harsh fluorine gas environment, they enhance visibility to ensure security (e.g., when used as camera lens, etc.), and reduce maintenance costs and improve the overall performance of the equipment.

Non-limiting, non-exhaustive listing of exemplary applications for glass systems (3) and (4) may include: windows on pressure gauges, windows on electronic equipment with numerical displays, protective shield windows that can be installed on equipment that is sensitive to harsh fluorine gases, windows that can be installed on chemical room doors or air tight chamber doors to provide visual access.

Figure 5:
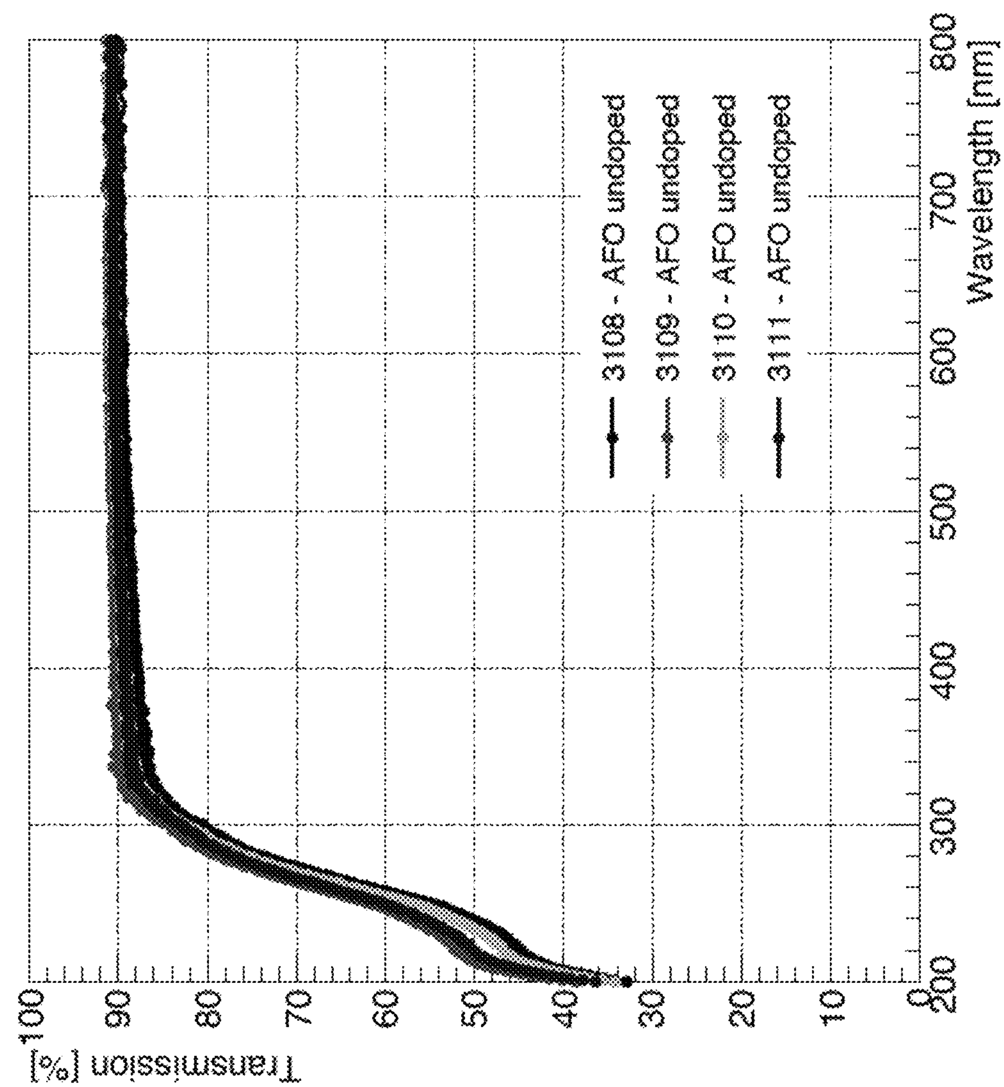
FIG. 5 is a non-limiting, exemplary illustration of the transparency spectrum measured by spectrophotometer, detailing the transmission curves for identical specimens of glass sample (3) in accordance with one or more embodiments of the present invention.

FIG. 5 illustrates the transparency spectrum measured by spectrophotometer, detailing the transmission curves for identical specimens of glass sample (3). As illustrated, all specimens have good transmission—well over 90% transparency.

Glass Sample (3)

aluminum metaphosphate $Al(PO_3)_3$, 15 mol percent;

barium metaphosphate $Ba(PO_3)_2$, 15 mol percent;

fluorides that are comprised of:

$BaF_2$, 35 mol percent;

$RF_x$=$MgF_2$, 35 mol percent.

As illustrated in FIG. 5, all specimens of glass sample (3) have excellent transmissions.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. An alkali free fluorophosphate glass formed from a composition, consisting of:
barium metaphosphate $Ba(PO_3)_2$, from 5 to 60 mol percent;
aluminum metaphosphate $Al(PO_3)_3$ from 5 to 60 mol percent, and
fluorides;
where the fluorides are selected from a group consisting of:
barium fluoride $BaF_2$ and RFx 10 to 40 mol percent;
where R is selected from a group consisting of: Mg, Ca, Sr, Pb, Y, Bi, Al, and subscript x is an index representing an amount of fluorine (F) in the compound $RF_x$; and
one or more dopant from 0.1 to 25 wt percent over 100 wt percent of the glass base composition,
the one or more dopant are selected from a group consisting of:
$CeO_2$, $CeF_3$, $Gd_2O_3$, $GdF_3$, $Dy_2O_3$, $DyF_3$, $Lu_2O_3$, $LuF_3$, and mixtures thereof.

2. An alkali free fluorophosphate glass formed from a composition, consisting of:
barium metaphosphate $Ba(PO_3)_2$, from 5 to 60 mol percent;
aluminum metaphosphate $Al(PO_3)_3$ from 5 to 60 mol percent, and
fluorides;
where the fluorides are selected from a group consisting of:
barium fluoride $BaF_2$ and RFx 10 to 90 mol percent;
where R is selected from a group consisting of: Mg, Ca, Sr, Pb, Y, Bi, Al, and subscript x is an index representing an amount of fluorine (F) in the compound $RF_x$; and
one or more dopant from 0.1 to 25 wt percent over 100 wt percent of the glass base composition,
the one or more dopant are selected from a group consisting of:
CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and mixtures thereof.

3. An alkali free fluorophosphate glass formed from a composition, consisting of:
barium metaphosphate $Ba(PO_3)_2$, from 5 to 60 mol percent;
aluminum metaphosphate $Al(PO_3)_3$ from 5 to 60 mol percent, and
fluorides;
where the fluorides are selected from a group consisting of:
barium fluoride $BaF_2$ and RFx 10 to 90 mol percent;
where R is selected from a group consisting of: Mg, Ca, Sr, Pb, Y, Bi, Al, and subscript x is an index representing an amount of fluorine (F) in the compound $RF_x$; and
one or more dopant from 0.1 to 25 wt percent over 100 wt percent of the glass base composition,
the one or more dopant are selected from a group consisting of:
$CeO_2$, $CeF_3$, $Gd_2O_3$, $GdF_3$, $Dy_2O_3$, $DyF_3$, $Lu_2O_3$, $LuF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and mixtures thereof.

4. An alkali free fluorophosphate glass formed from a composition, consisting of:
barium metaphosphate $Ba(PO_3)_2$, in mol %;
aluminum metaphosphate $Al(PO_3)_3$ in mol %,
fluorides;
where the fluorides are selected from a group consisting of:
barium fluoride $BaF_2$ and RFx in mol %;
where R is selected from a group consisting of: Mg, Ca, Sr, Pb, Y, Bi, Al, and subscript x is an index representing an amount of fluorine (F) in the compound $RF_x$; and
one or more dopant in wt percent over 100 wt percent of the glass base composition;
the one or more dopant are selected from a group consisting of:
$CeO_2$, $CeF_3$, $Gd_2O_3$, $GdF_3$, $Dy_2O_3$, $DyF_3$, $Lu_2O_3$, $LuF_3$, and mixtures thereof.

5. An alkali free fluorophosphate glass formed from a composition, consisting of:
barium metaphosphate $Ba(PO_3)_2$, in mol %;
aluminum metaphosphate $Al(PO_3)_3$ in mol %,
fluorides;
where the fluorides are selected from a group consisting of:
barium fluoride $BaF_2$ and RFx in mol %;
where R is selected from a group consisting of: Mg, Ca, Sr, Pb, Y, Bi, Al, and subscript x is an index representing an amount of fluorine (F) in the compound $RF_x$; and
one or more dopant in wt percent over 100 wt percent of the glass base composition,
the one or more dopant are Transition metal selected from a group consisting of:
CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$.

6. An alkali free fluorophosphate glass formed from a composition, consisting of:
barium metaphosphate $Ba(PO_3)_2$, in mol %;
aluminum metaphosphate $Al(PO_3)_3$ in mol %,
fluorides;
where the fluorides are selected from a group consisting of:
barium fluoride $BaF_2$ and RFx in mol %;
where R is selected from a group consisting of: Mg, Ca, Sr, Pb, Y, Bi Al, and subscript x is an index representing an amount of fluorine (F) in the compound $RF_x$; and
one or more dopant in wt percent over 100 wt percent of the glass base composition;
the one or more dopant are selected from a group consisting of:
$CeO_2$, $CeF_3$, $Gd_2O_3$, $GdF_3$, $Dy_2O_3$, $DyF_3$, $Lu_2O_3$, $LuF_3$, CuO, $CuF_2$, $TiO_2$, $TiF_4$, $Cr_2O_3$, $CrF_3$, $Mo_2O_3$, $MoF_3$, $W_2O_3$, $WF_3$, $MnO_2$, $MnF_4$, $Co_2O_3$, $CoF_3$, $Ni_2O_3$, $NiF_3$, and mixtures thereof.

7. An alkali free fluorophosphate glass formed from a composition, consisting of:
barium metaphosphate $Ba(PO_3)_2$, from 5 to 60 mol percent;
aluminum metaphosphate $Al(PO_3)_3$ from 5 to 60 mol percent, and
fluorides;

where the fluorides are selected from a group consisting of:

barium fluoride $BaF_2$ 10 to 40 mol percent;

$MgF_2$, and RFx 10 to 90 mol percent; and where R is selected from a group consisting of: Ca, Sr, Pb, Y, Bi, Al, La, and subscript x is an index representing an amount of fluorine (F) in the compound $RF_x$, and one or more dopant from 0.1 to 25 wt percent over 100 wt percent of the glass base composition, the one or more dopant are selected from a group consisting of:

$CeO_2$, $CeF_3$, $Pr_2O_3$, $PrF_3$, $Nd_2O_3$, $NdF_3$, $Sm_2O_3$, $SmF_3$, $Eu_2O_3$, $EuF_3$, $Gd_2O_3$, $GdF_3$, $Tb_2O_3$, $TbF_3$, $Dy_2O_3$, $DyF_3$, $Ho_2O_3$, $HoF_3$, $Er_2O_3$, $ErF_3$, $Tm_2O_3$, $TmF_3$, $Yb_2O_3$, $YbF_3$, $Lu_2O_3$, $LuF_3$, and mixtures thereof.

8. An alkali free fluorophosphate glass formed from a composition, consisting of:

barium metaphosphate $Ba(PO_3)_2$, from 5 to 60 mol percent;

aluminum metaphosphate $Al(PO_3)_3$ from 5 to 60 mol percent, and fluorides;

where the fluorides are selected from a group consisting of:

barium fluoride $BaF_2$ 10 to 40 mol percent;

$MgF_2$, and RFx 10 to 90 mol percent;

where R is selected from a group consisting of: Ca, Sr, Pb, Y, Bi, Al, La, and subscript x is an index representing an amount of fluorine (F) in the compound $RF_x$, and one or more dopant from 0.1 to 25 wt percent over 100 wt percent of the glass base composition, the one or more dopant are selected from a group consisting of: CuO, $CuF_2$, $TiO_2$, $TiF_4$, $Cr_2O_3$, $CrF_3$, $Mo_2O_3$ $MoF_3$, $W_2O_3$, $WF_3$, $MnO_2$, $MnF_4$, $Co_2O_3$, $CoF_3$, $Ni_2O_3$, $NiF_3$, and mixtures thereof.

9. An alkali free fluorophosphate glass formed from a composition, consisting of:

barium metaphosphate $Ba(PO_3)_2$, from 5 to 60 mol percent;

aluminum metaphosphate $Al(PO_3)_3$ from 5 to 60 mol percent, and fluorides;

where the fluorides are selected from a group consisting of:

barium fluoride $BaF_2$ 10 to 40 mol percent;

$MgF_2$, and RFx 10 to 90 mol percent;

where R is selected from a group consisting of: Ca, Sr, Pb, Y, Bi, Al, La, and subscript x is an index representing an amount of fluorine (F) in the compound $RF_x$, and one or more dopant from 0.1 to 25 wt percent over 100 wt percent of the glass base composition, the one or more dopant are selected from a group consisting of:

$CeO_2$, $CeF_3$, $Pr_2O_3$, $PrF_3$, $Nd_2O_3$, $NdF_3$, $Sm_2O_3$, $SmF_3$, $Eu_2O_3$, $EuF_3$, $Gd_2O_3$, $GdF_3$, $Tb_2O_3$, $TbF_3$, $Dy_2O_3$, $DyF_3$, $Ho_2O_3$, $HoF_3$, $Er_2O_3$, $ErF_3$, $Tm_2O_3$, $TmF_3$, $Yb_2O_3$, $YbF_3$, $Lu_2O_3$, $LuF_3$, CuO, $CuF_2$, $TiO_2$, $TiF_4$, $Cr_2O_3$, $CrF_3$, $Mo_2O_3$ $MoF_3$, $W_2O_3$, $WF_3$, $MnO_2$, $MnF_4$, $Co_2O_3$, $CoF_3$, $Ni_2O_3$, $NiF_3$, and mixtures thereof.

10. An alkali free fluorophosphate glass formed from a composition, consisting of:

barium metaphosphate $Ba(PO_3)_2$, in mol %;

aluminum metaphosphate $Al(PO_3)_3$, in mol %, and fluorides;

where the fluorides are selected from a group consisting of:

barium fluoride $BaF_2$ in mol %;

$MgF_2$, and RFx in mol %;

where R is selected from a group consisting of: Ca, Sr, Pb, Y, Bi, Al, La, and subscript x is an index representing an amount of fluorine (F) in the compound $RF_x$, and one or more dopant in wt percent over 100 wt percent of the glass base composition, the one or more dopant are selected from a group consisting of:

$CeO_2$, $CeF_3$, $Pr_2O_3$, $PrF_3$, $Nd_2O_3$, $NdF_3$, $Sm_2O_3$, $SmF_3$, $Eu_2O_3$, $EuF_3$, $Gd_2O_3$, $GdF_3$, $Tb_2O_3$, $TbF_3$, $Dy_2O_3$, $DyF_3$, $Ho_2O_3$, $HoF_3$, $Er_2O_3$, $ErF_3$, $Tm_2O_3$, $TmF_3$, $Yb_2O_3$, $YbF_3$, $Lu_2O_3$, $LuF_3$, and mixtures thereof.

11. An alkali free fluorophosphate glass formed from a composition, consisting of:

barium metaphosphate $Ba(PO_3)_2$, in mol %;

aluminum metaphosphate $Al(PO_3)_3$, in mol %, and fluorides;

where the fluorides are selected from a group consisting of:

barium fluoride $BaF_2$ in mol %;

$MgF_2$, and RFx in mol %;

where R is selected from a group consisting of: Ca, Sr, Pb, Y, Bi, Al, La, and subscript x is an index representing an amount of fluorine (F) in the compound $RF_x$, and one or more dopant in wt percent over 100 wt percent of the glass base composition, the one or more dopant are selected from a group consisting of:

CuO, $CuF_2$, $TiO_2$, $TiF_4$, $Cr_2O_3$, $CrF_3$, $Mo_2O_3$ $MoF_3$, $W_2O_3$, $WF_3$, $MnO_2$, $MnF_4$, $Co_2O_3$, $CoF_3$, $Ni_2O_3$, $NiF_3$, and mixtures thereof.

12. An alkali free fluorophosphate glass formed from a composition, consisting of:

barium metaphosphate $Ba(PO_3)_2$, in mol %;

aluminum metaphosphate $Al(PO_3)_3$, in mol %, and fluorides;

where the fluorides are selected from a group consisting of:

barium fluoride $BaF_2$ in mol %;

$MgF_2$, and RFx in mol %;

where R is selected from a group consisting of: Ca, Sr, Pb, Y, Bi, Al, La, and subscript x is an index representing an amount of fluorine (F) in the compound $RF_x$, and one or more dopant in wt percent over 100 wt percent of the glass base composition, the one or more dopant are selected from a group consisting of:

$CeO_2$, $CeF_3$, $Gd_2O_3$, $GdF_3$, $Dy_2O_3$, $DyF_3$, $Lu_2O_3$, $LuF_3$, CuO, $CuF_2$, $TiO_2$, $TiF_4$, $Cr_2O_3$, $CrF_3$, $Mo_2O_3$ $MoF_3$, $W_2O_3$, $WF_3$, $MnO_2$, $MnF_4$, $Co_2O_3$, $CoF_3$, $Ni_2O_3$, $NiF_3$, and mixtures thereof.

13. An alkali free fluorophosphate glass formed from a composition, consisting of:

barium metaphosphate $Ba(PO_3)_2$, from 5 to 60 mol percent;

aluminum metaphosphate $Al(PO_3)_3$ from 5 to 60 mol percent, and fluorides;

where the fluorides are selected from a group consisting of:

barium fluoride $BaF_2$ and RFx 10 to 70 mol percent;

where R is selected from a group consisting of: Mg, Ca, Sr, Pb, Y, Bi, Al, wherein subscript x is an index representing an amount of fluorine (F) in the compound $RF_x$.

14. An alkali free fluorophosphate glass formed from a composition, consisting of:

barium metaphosphate $Ba(PO_3)_2$, from 5 to 60 mol percent;
aluminum metaphosphate $Al(PO_3)_3$ from 5 to 60 mol percent, and
fluorides;
where the fluorides are selected from a group consisting of:
barium fluoride $BaF_2$ 10 to 40 mol percent;
$MgF_2$, and RFx 10 to 90 mol percent;
where R is selected from a group consisting of: Ca, Sr, Pb, Y, Bi, Al, La, and subscript x is an index representing an amount of fluorine (F) in the compound $RF_x$.

15. An alkali free fluorophosphate glass formed from a composition, consisting of:
barium metaphosphate $Ba(PO_3)_2$, in mol percent;
aluminum metaphosphate $Al(PO_3)_3$ in mol percent, and
fluorides;
where the fluorides are selected from a group consisting of:
barium fluoride $BaF_2$ in mol percent;
$MgF_2$, and RFx in mol percent;
where R is selected from a group consisting of: Ca, Sr, Pb, Y, Bi, Al, La, and subscript x is an index representing an amount of fluorine (F) in the compound $RF_x$.

* * * * *